(12) United States Patent
Osawa

(10) Patent No.: US 7,069,059 B2
(45) Date of Patent: Jun. 27, 2006

(54) ELECTRONIC DEVICE AND INTERFACE DEVICE

(75) Inventor: Shohei Osawa, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 118 days.

(21) Appl. No.: 10/921,096

(22) Filed: Aug. 19, 2004

(65) Prior Publication Data

US 2005/0047082 A1 Mar. 3, 2005

(30) Foreign Application Priority Data

Aug. 22, 2003 (JP) ............................. 2003-208476

(51) Int. Cl.
*H04B 1/38* (2006.01)
(52) U.S. Cl. ..................... 455/572; 455/557; 455/573
(58) Field of Classification Search ................ 455/572, 455/557, 573; 340/539.1; 379/56.2; 235/462.43
See application file for complete search history.

(56) References Cited

U.S. PATENT DOCUMENTS 5,953,656 A * 9/1999 Bertocci .................. 455/412.2
5,959,287 A * 9/1999 Myers et al. ........... 235/472.02
6,102,284 A * 8/2000 Myers et al. ................ 235/375

FOREIGN PATENT DOCUMENTS

| JP | 11-252017 A | 9/1999 |
|---|---|---|
| JP | 2001-142837 A | 5/2001 |
| JP | 2002-023896 A | 1/2002 |

* cited by examiner

*Primary Examiner*—Joseph Feild
*Assistant Examiner*—S. Smith
(74) *Attorney, Agent, or Firm*—Birch, Stewart, Kolasch & Birch, LLP

(57) ABSTRACT

When a portable information terminal device is connected with a cradle, a power interface is connected to a power interface being connected to an external power source so as to allow power to transfer. When the portable information terminal device is connected with the cradle, an optical interface is connected to an optical interface being connected to an external device so as to allow communications. A main function block having a control function to function when the portable information terminal device is not connected with the cradle, is connected to a main power source and the power interface so as to allow power to transfer. The optical interface is arranged so that power is supplied from only the power interface. In such arrangement, a terminal becomes more durable, because optical communication is performed. Further, only the external power source supplies power to the optical interface when the optical interface is connected with the cradle.

24 Claims, 18 Drawing Sheets

10: LIGHT RECEIVING/EMITTING MODULE

ELECTRONIC DEVICE AND INTERFACE DEVICE

This Nonprovisional application claims priority under 35 U.S.C. § 119(a) on Patent Application No. 2003/208476 filed in Japan on Aug. 22, 2003, the entire contents of which are hereby incorporated by reference.

FIELD OF THE INVENTION

The present invention relates to a portable information device such as a computer, a PDA (Personal Digital Assistant), or a potable player, and relates to a cradle, which is connected to the portable information device so as to exchange data with the portable information device.

BACKGROUND OF THE INVENTION

A volume of information to be handled by a portable information device today, has been growing to be remarkably huge, along with the improvement in a screen display device and/or a recording medium, and along with the popularization of multimedia usage. Under such circumstances, becoming popular is a cradle that serves as an interface. Using the cradle, the portable information device can easily be charged, and can simply exchange information with external devices. Such a cradle includes a power interface and a communication interface each having a metal connector. The cradle plays a role as a relaying device (transponder) that enables the portable information device and the external device to access each other.

It should be noted that the following patent documents 1 through 3 are known as the prior arts related to the present invention.

Patent document 1, i. e., Japanese Unexamined Patent Publication No. 2001-142837 (Tokukai 2001-142837; published on May 25, 2001), discloses an interface device for connecting a portable information terminal device to external devices. An object of the interface device is to simultaneously connecting a plurality of the external devices, without causing an inadequate connection. More specifically, according to the interface device, an infrared light receiving/emitting section is provided in a terminal receiving section of a cradle serving as a relaying device for the portable information terminal device and the external devices. The infrared light receiving/emitting section is provided for performing a non-contact communication, with the use of an infrared light emitting signal, with the portable information terminal device mounted on the terminal receiving section. Further, a USB connection terminal and an RS232C connection terminal are provided as connection terminals for the external devices, so that data signals which are transmitted to or received from, via the infrared light emitting signal, the portable information terminal device are sent to an external personal computer and/or a modem, via a USB interface or an RS232C interface. Moreover, the interface device detects whether or not the external devices are connected with the USB connection terminal, and whether or not the external devices are connected with the RS232C connection terminal, and informs the portable information terminal device of connection results thus detected.

Patent document 2, i. e., Japanese Unexamined Patent Publication No. 2002-23896 (Tokukai 2002-23896; published on Jan. 25, 2002), discloses an electronic device whose object is to surely perform data processing with respect to data whose power consumption is large. More specifically, when (i) a connection with a cradle is detected in accordance with an output from a cradle detecting section which detects whether or not a portable information device is placed on a receiving section of the cradle, and (ii) power supply from an external power source is confirmed in accordance with an output signal from a power source detection control section, data processing means carries out the data processing, which requires large power consumption, such as encoding process which has been registered by writing in flag data.

Patent document 3, i.e., Japanese Unexamined Patent Publication No. 252017/1999 (Tokukaihei 11-252017; published on Sep. 17, 1999) discloses a portable wireless terminal having infrared data communication function, whose object is to reduce power consumption of infrared data communication by detecting an infrared data communication partner so that infrared light emission power is appropriately controlled, even when communication distance changes. More specifically, the portable wireless terminal is provided with (i) an infrared data communication section for transmitting and receiving signals in an infrared frequency band, (ii) a communication partner detecting section for detecting information indicative of the infrared data communication partner, and (iii) a control section for controlling light emission power of the infrared data communication section in accordance with the information, indicative of the infrared data communication partner, which has been detected by the communication partner detecting section.

However, in each of the foregoing cradles, the terminal connecting terminal for the portable information device is a socket-type connector. This causes the problems that the socket-type connector becomes fragile by frequently repeating plugging and unplugging, and an inadequate connection is easily brought about.

Meanwhile, a size of the portable information device has been reduced to enhance mobility. In contrast, the power consumption has been growing, due to development of a screen display device, and development of a multi-media related function, in the portable information device. Under such circumstances, it is necessary to efficiently use power to carry around the portable information device for a long time.

SUMMARY OF THE INVENTION

In view of the foregoing problems, the present invention is made, and an object of the present invention is to provide an electronic device and an interface device, respectively for solving a problem in durability of connecting terminal of a cradle.

In order to achieve the foregoing object, an electronic device in accordance with the present invention is an electronic device, that is attachable to and detachable from an interface device, wherein (i) the electronic device includes a first power interface, a first communication interface, a main function block, and a main power source, (ii) the interface device includes a second power interface, and a second communication interface, (iii) the first power interface is connected to the second power interface to which an external power source is connected so that power transfer can be carried out between the first and second power interfaces, while the electronic device is connected to the interface device, (iv) the first communication interface is connected to the second communication interface, to which an external device is connected, so that a communication can be carried out between the first and second communication interfaces, while the electronic device is connected to the interface device, the first communication interface being connected to the first power interface so that power supply can be carried out only between the first communication interface and the first power interface, and (v) the main function block, having a control function which functions when the electronic device is not connected to the interface device, is connected to the main power source and the first power interface so that power supply can be carried out between the main function block and the main power source, and between the main power source and the first power interface.

With the arrangement, the first communication interface operates upon receipt of the power supplied from the external power source, while the electronic device is attached to the interface device. However, while the electronic device is detached from the interface device, the first communication interface stops the operation because no power is supplied to the first communication interface. In contrast, the main function block is connected to the main power source. This allows the main function block to receive the power supply from the main power source. As such, the main function block operates, even when the electronic device is not attached to the interface device.

Accordingly, in the electronic device, the first communication interface has no power consumption, while the electronic device is detached from the interface device. This allows the reduction of the power consumption.

Further, the electronic device of the present invention is an electronic device, that is attachable to and detachable from an interface device, wherein: (i) the electronic device includes a first power interface, a first communication interface, a main function block, and a main power source, (ii) the interface device includes a second power interface, and a second communication interface, (iii) the first power interface is connected to the second power interface to which an external power source is connected so that power transfer can be carried out between the first and second power interfaces, while the electronic device is connected to the interface device, (iv) the first communication interface is connected to the second communication interface, to which an external device is connected, so that a communication can be carried out between the first and second communication interfaces, while the electronic device is connected to the interface device, the first communication interface being connected to the first power interface so that power supply can be carried out only between the first communication interface and the first power interface, and (v) the main function block, having a control function which functions when the electronic device is not connected to the interface device, is connected to the main power source and the first power interface so that power supply can be carried out between the main function block and the main power source, and between the main power source and the first power interface.

With the arrangement, the first communication interface operates upon receipt of the power supplied from the external power source, while the electronic device is attached to the interface device. Further, while the electronic device is detached from the interface device, the first communication interface stops operating, when the switching means selects the first power interface. This is because the first communication interface cannot receive the power supply. On the contrary, when the switching means selects the main power source, the first communication interface operates because it receives the power supply from the main power source. Meanwhile, the main function block is connected to the main power source. This allows the main function block to receive the power supply from the main power source. As such, the main function block operates, even when the electronic device is detached from the interface device.

According to the electronic device, while the electronic device is detached from the interface device, it is possible to supply the power to the first communication interface during only the period when, for example, the communication is carried out between the electronic device and the external device via the first communication interface. Thus, it is possible to minimize the power consumption. Further, it is possible to perform the data communication with the external device or the like, even when the electronic device is not connected to the interface device.

Further, an interface device of the present invention may be an interface device, that is attachable to and detachable from an electronic device, including a second power interface, and a second communication interface, the second communication interface has a function for controlling the communication between the first and second communication interfaces.

With the arrangement, it is possible to realize an interface device (i.e., a cradle) which can simply carry out the charging of the electronic device, and can simply carry out the data communication between the electronic device and the external device.

Further, the interface device of the present invention may be an interface device, that is attachable to and detachable from an electronic device, including a second power interface, and a second communication interface, in which the second communication interface serves as a connection terminal for an optic fiber, and the optic fiber is connected to the external device having a function for controlling the communication between the first and second communication interfaces.

With the arrangement, it is possible to realize an interface device (i.e., a cradle) which can easily carry out the charging of the electronic device, and can easily carry out the data communication between the electronic device and the external device. Further, it is possible to realize the interface device having a simple configuration. This is because the external device can have the function for controlling the communication with the first communication interface. In other words, this is because the interface device merely requires that only optical fiber connection terminal be provided, i.e., the interface device requires no function for controlling the communication. This allows the interface device to have a simple configuration.

Additional objects, features, and strengths of the present invention will be made clear by the description below. Further, the advantages of the present invention will be evident from the following explanation in reference to the drawings.

DESCRIPTION OF THE EMBODIMENTS

The following will describe an embodiment of the present invention with reference to FIGS. 1 through 18.

Figure 1:
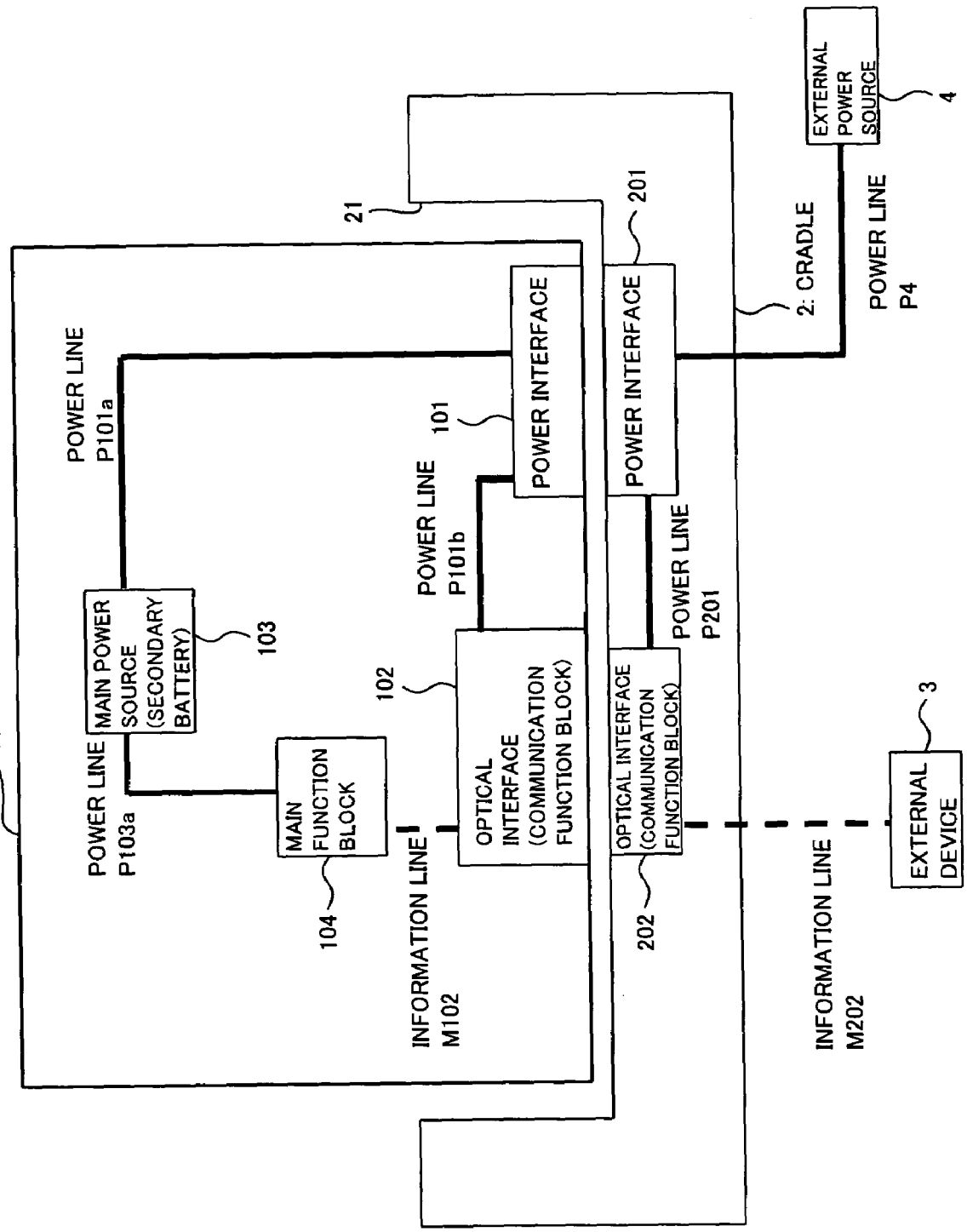
FIG. 1 is a block diagram showing a schematic configuration of a portable information terminal device and a cradle according to one embodiment of the present invention.
Figure 2:
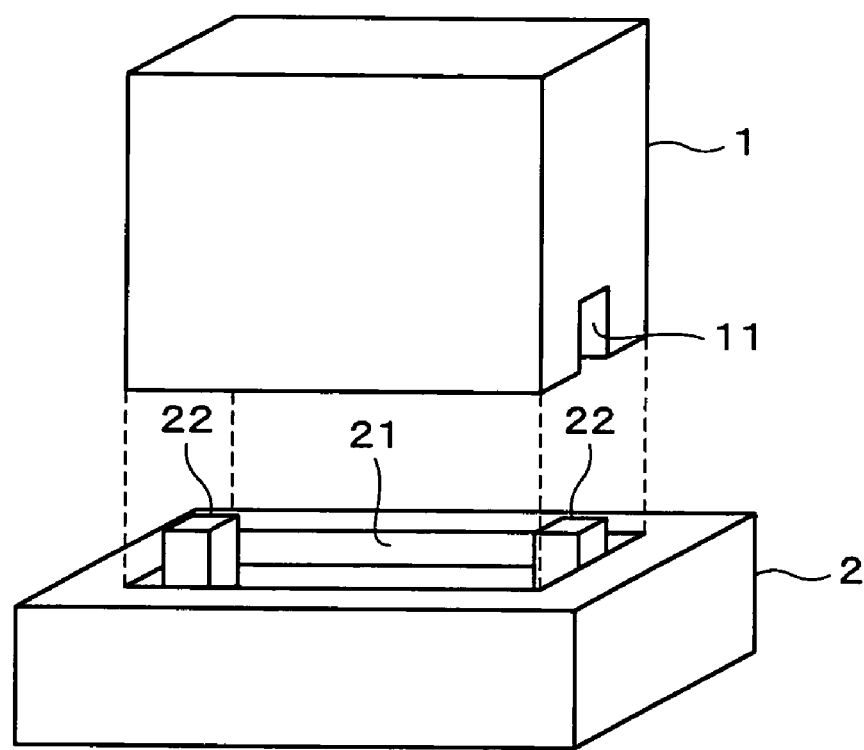
FIG. 2 is a perspective view showing a schematic outline of the portable information terminal device and the cradle shown in FIG. 1.

FIG. 1 is a block diagram showing a schematic configuration of a portable information terminal device 1 and a cradle 2 according to the present embodiment. FIG. 2 is a perspective view showing a schematic outline of the portable information terminal device 1 and the cradle 2.

The portable information terminal device (electronic device) 1 indicates, for example, a computer, a PDA (Personal Digital Assistant), and a portable player. The cradle (interface device) 2 is provided for charging the portable information terminal device 1, and for easily exchanging information with an external device 3. For such purposes, each of the portable information terminal device 1 and the cradle 2 includes a power-use interface and a communication-use interface. Especially, the cradle 2 uses an optical interface as the communication-use interface. It should be noted that, a metal connector and/or electromagnetic induction technique can be used as the power-use interface.

Thus, the communication between the portable information terminal device 1 and the cradle 2 are performed via the optical interface. This prevents the cradle 2 form being damaged by a repeated plugging and unplugging of its connector. Further, the usage of the optical interface allows high-speed data communications. It should be noted that, in the present embodiment, the following description deals with the case where the communication, between the portable information terminal device 1 and the cradle 2, are performed via the optical interface. However, the present invention is not limited to this case, for example, it is also possible to adopt another communication technique.

The following describes a specific configuration of the portable information terminal device 1 and the cradle 2. Particularly, the following description deals with in detail an arrangement for suppressing power consumption which increases due to the use of the optical interface for the communication, and an arrangement for easily and surely connecting the portable information terminal device 1 with the cradle 2.

As shown in FIG. 2, the cradle 2 includes a guide 22, in a recessed section 21, for holding the portable information terminal device 1 so as to surely connect the power interface with the communication interface. In the recessed section 21, the portable information terminal device 1 is inserted. The portable information terminal device 1 includes a guide 11 which engages with the cradle-end guide 22.

As shown in FIG. 1, the recessed section 21 of the cradle 2 includes (i) a power interface (second power interface) 201, serving as the power-use interface, for supplying power to the portable information terminal device 1 which is inserted into the recessed section 21, and (ii) an optical interface (second communication interface) 202, serving as the communication-use interface, for performing data communication with the external device 3. It should be noted that, the external device 3 has a function of performing the data communication with the portable information terminal device 1 via the cradle 2. The external device 3 indicates, for example, a desktop computer or a network device.

The power interface 201 receives a power supply from an external power source 4 via a power line P4. The power interface 201 supplies the power to the optical interface 202 via a power line P201.

The optical interface 202 performs data communication with the optical interface 102 so as to relay data communication between the external device 3 and the portable information terminal device 1 via an information line M202. It should be noted that, the information line M202 may be a metallic wire or an optical fiber.

Further, the portable information terminal device 1 includes a power interface (first power interface) 101 and an optical interface (first communication interface) 102. The power interface 101 and the optical interface 102 are arranged so that they face the power interface 201 and the optical interface 202 of the cradle 2, respectively, when the portable information terminal device 1 is placed on the cradle 2. The portable information terminal device 1 further includes a main power source 103 and a main function block 104.

The power interface 101 supplies the power, which has been supplied from the power interface 201, to the main power source 103 and the optical interface 102, via power lines P101a and P101b, respectively.

The main power source 103 is a secondary battery. Namely, the main power source 103 is charged by the power supplied from the power interface 101, via the power line P101a. The main power source 103 supplies the power to the main function block 104. It should be noted that the power interface 101 may directly supply the power to the main function block 104, instead of going through the main power source 103.

Here, in the portable information terminal device 1, control function is provided so as to be divided into the following two functions, i.e., the main function block 104 and the optical interface 102. The optical interface 102 performs controlling related to the communications, and includes a communication control-use IC, an optical transceiver, a light emitting device, a light receiving device, a connector, and the like. In contrast, the main function block 104 carries out all the controlling unrelated to the communication with the cradle 2 among the control functions of the portable information terminal device 1. For example, if the portable information terminal device 1 is a portable music player, then the main function block 104 includes a music reproduction function, a screen display function, a power management function, and other functions.

The optical interface 102 is driven upon receipt of the power supplied from the power interface 101 via the power line P101b, while the portable information terminal device 1 is placed on the cradle 2. By performing the data communication with optical interface 202, the optical interface 102 relays the data communication, via an information line M102, between the main function block 104 and the cradle 2.

While the power is supplied from the power interface 101, i.e., while the portable information terminal device 1 is placed on the cradle 2, the main function block 104 is driven upon receipt of the power from the power interface 101 via the power line P101a and P103a. In contrast, the power is supplied to the main function block 104 from the main power source 103 via the power line P103a, when the power is not supplied from the power interface 101, for example, when the portable information terminal device 1 is not placed on the cradle 2, or when the portable information terminal device 1 is placed on the cradle 2, but not enough power is supplied to the main function block 104.

Thus, in the portable information terminal device 1, the optical interface 102 is separated from the main function block 104. This causes only the main function block 104 to receive the power from the main function block 104. As such, the optical interface 102 operates upon receipt of the power from the external power source 4, while the portable information terminal device 1 is placed on the cradle 2. However, while the portable information terminal device 1 is not placed on the cradle 2, the optical interface 102 stops operating, because the power is not supplied to the optical interface 102.

Each of the power interfaces 101 and 201 has a metal connector serving as a connecting terminal. Alternatively, the power interfaces 101 and 201 may be realized by using the electromagnetic induction technique. It is possible to realize a portable information terminal device 1 and a cradle 2 respectively having waterproof property, when the electromagnetic induction technique is introduced to the power interfaces 101 and 201, and when non-contact type interfaces are used as the optical interfaces 102 and 202. An arrangement other than the arrangement in which the connector is plugged in may be used as the non-contact type optical interfaces 102 and 202. Such an arrangement is shown in for example FIG. 3 in which light receiving/emitting modules 10 are provided to face each other.

Figure 3:
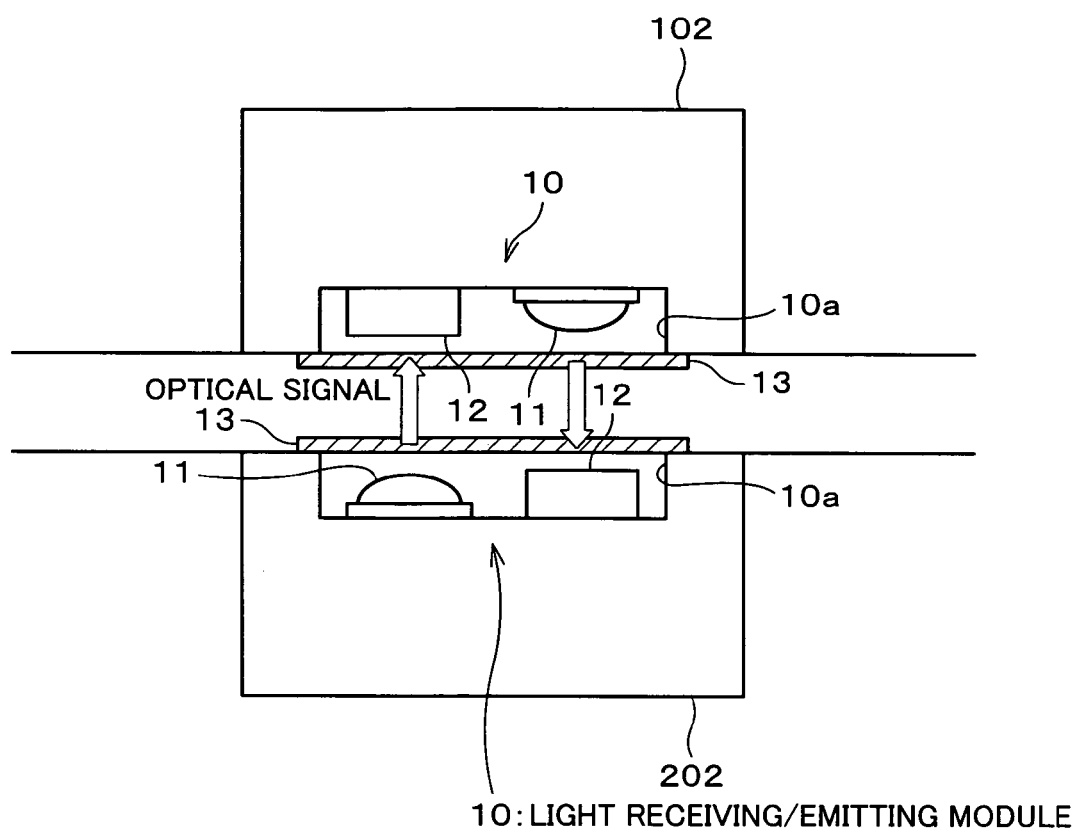
FIG. 3 is an explanatory diagram showing a schematic configuration of an optical interface of the portable information terminal device and the cradle shown in FIG. 1.

FIG. 3 is an explanatory diagram showing a schematic configuration of the optical interfaces 102 and 202.

For example, as shown in FIG. 3, each of the optical interfaces 102 and 202 has the light receiving/emitting module 10 in a transparent window (opened section 10a) through which an optical signal transmits. The light receiving/emitting module 10 includes a light emitting section 11 serving as a light emitting device, and a light receiving section 12 serving as a light receiving device. It should be noted that the light receiving/emitting module 10 may be so arranged that the light emitting section 11 and the light receiving section 12 are integral with each other. Alternatively, a filter 13 for diffusing the incident light may be provided so as to cover an exit aperture, from which the light is emitted, of the light receiving/emitting module 10. The filter 13 allows alleviation of requirements for registration of an optical axis.

Alternatively, the optical interfaces 102 and 202 may be so arranged that the optical interfaces 102 and 202 are connected with each other at a position, where tilting angle caused by the load of the portable information terminal device 1 is 0; for example, at a center of a bottom surface of the recessed portion 21. This arrangement makes it possible to suppress (i) shift of the optical axis of the optical signal during the communications, and/or (ii) affect due to disturbance light during the communication, which are caused by the weight of portable information terminal device 1. This allows a high-speed data communication.

Alternatively, the optical interfaces 102 and 202 may be arranged so that the optical interface 202 is provided on a side surface of the recessed section 21, and so that the optical interface 102 is provided on a side surface, which faces the side surface on which the optical interface 202 is provided, of the portable information terminal device 1 (not shown). With the arrangement, the optical interfaces 102 and 202 are kept from accumulating dust on their light receiving surfaces and light emitting surfaces, respectively. Further, with the arrangement, it is possible to provide the optical fiber with ease, while taking account of bending loss. As such, it is possible to reduce a size of a housing of the cradle 2.

Further, the optical interfaces 102 and 202 are shielded so that the light used in the communication is kept from leaking outside, while the disturbance light, such as the natural light and/or the fluorescent light, is kept from mixing in in order to reduce disturbing noise. For example, around each connecting section of the optical interface 102 and 202, a shielding member (not shown) for blocking the disturbance light disturbing the optical communication during the communicating. With such a shielding member, the disturbance light is kept from directing between the light receiving sections 11 and light emitting sections 12 of the respective optical interfaces 102 and 202. As a result, it is possible to avoid that a communication quality deteriorates due to the noise of the disturbance light. This allows the high-speed data communications.

The optical interface 102 of the portable information terminal device 1 may include a device in which a communication of analog metal signals and an optical two-way communication can be carried out. More specifically, it is possible to share a plug insertion hole serving as the connecting section, with an analog terminal such as audio input/output terminal (e. g. headphone jack). In the plug insertion hole, a plug detecting terminal may be provided for detecting an analog plug, so as to send and receive an analog signal when the analog plug is plugged in. As such, the optical interface 102 can switch operations in accordance with a type of cable which has been plugged in the plug hole. This allows a single insertion plug to have a plurality of functions such as: (i) a function of optical space communication, (ii) a function of optical fiber communication, and (iii) a function of input and output of analog signals such as signal output to headphones. Thus, it is possible to reduce the size of the portable information terminal device 1. It should be noted that, in the optical interface 102, the light receiving/emitting module 10, in which the light receiving section 12 and the light emitting section 11 are cast so as to be integral with each other, may be provided in the plug insertion hole that can also perform the communication of the analog metal signals.

Further, in the portable information terminal device 1 and the cradle 2, the optical interfaces 102 and 202 are arranged so that the light receiving sections 11 and the light emitting sections 12, facing each other, maintain their distance and their angle by which the communication can be carried out. For example, when the guides 11 and 22 engage with each other, the portable information terminal device 1 is fixed to the cradle 2, and an optical axis of the optical interface 102 is matched with an optical axis of the optical interface 202. Thus, the guides 11 and 22 serve as a guideline. It should be noted that shapes of the guides 11 and 22 are not limited to specific ones. The shapes of the guides 11 and 22 can be selected in accordance with the needs, provided that the shapes can realize the above two functions.

It is preferable that the portable information terminal device 1 is more tightly fixed to the cradle 2 than an ordinary electronic device is fixed to a cradle, in order that the optical interfaces 102 and 202 to have an identical optical axis. This is because, in the present embodiment, the optical communication is carried out via the optical interfaces 102 and 202.

Figure 4:
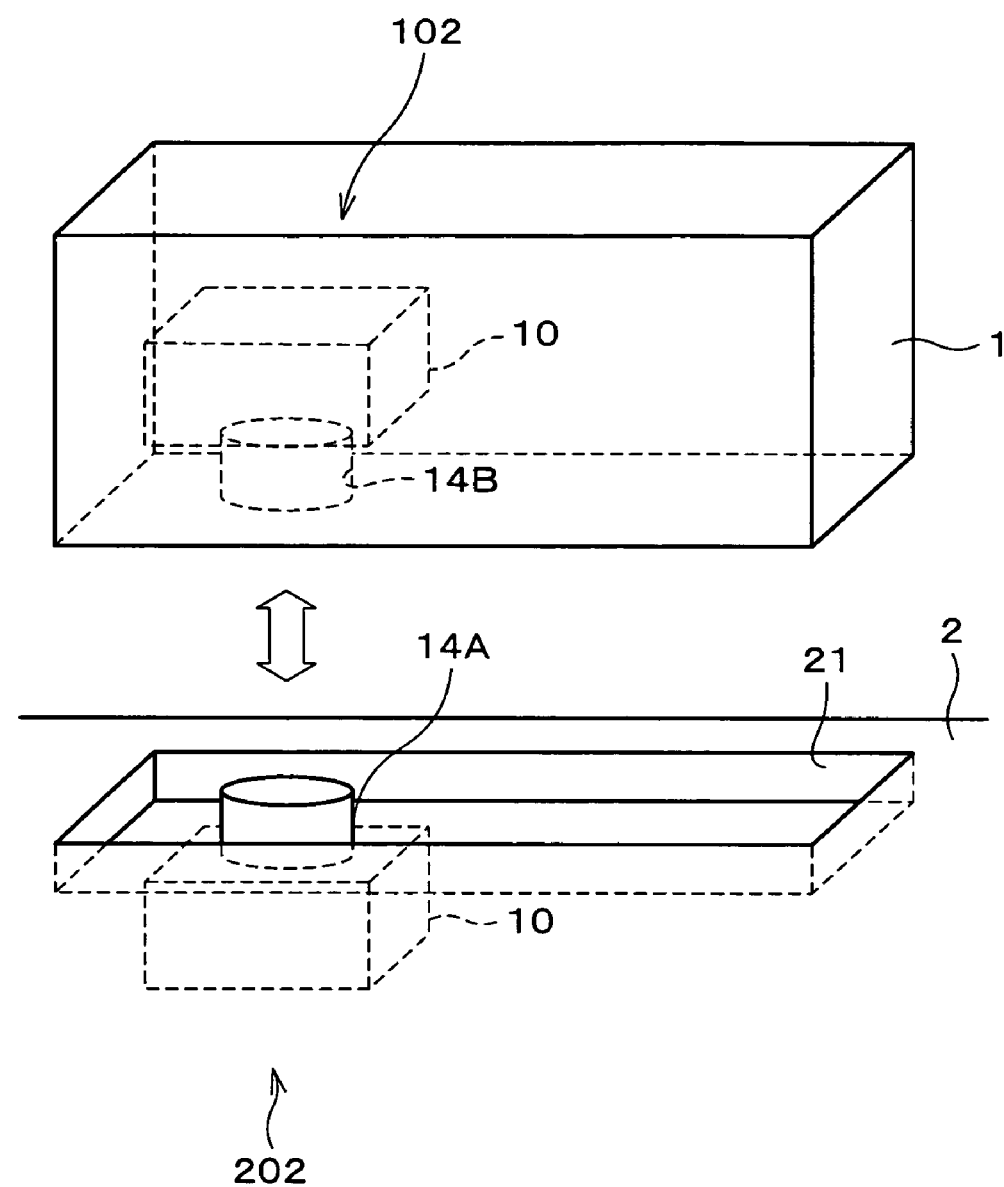
FIG. 4 is an explanatory diagram showing a schematic outline of an optical interface of the portable information terminal device and the cradle shown in FIG. 1.

FIG. 4 is an explanatory diagram showing an example of shapes of the optical interfaces 102 and 202.

As shown in FIG. 4, the optical interfaces 102 and 202 may be formed such that they are connected to each other by jointing a protruded jointing section 14A of the cradle 2 and a recessed jointing section 14B on the portable information terminal device 1. Inside of the protruded jointing section 14A serves as a light waveguide. The light receiving/emitting modules 10 of the optical interfaces 102 and 202 are arranged to face each other so that the optical communication can be carried out through the light waveguide, while the protruded jointing section 14A and the recessed jointing section 14B are jointed.

As such, the arrangement in which the light waveguide is incorporated, i.e., the arrangement of the jointing section, including the opening from which the light is emitted, which is provided in the light receiving/emitting module 10 can be used as a guideline for causing the optical interfaces 102 and 202 to have an identical optical axis.

Figure 5:
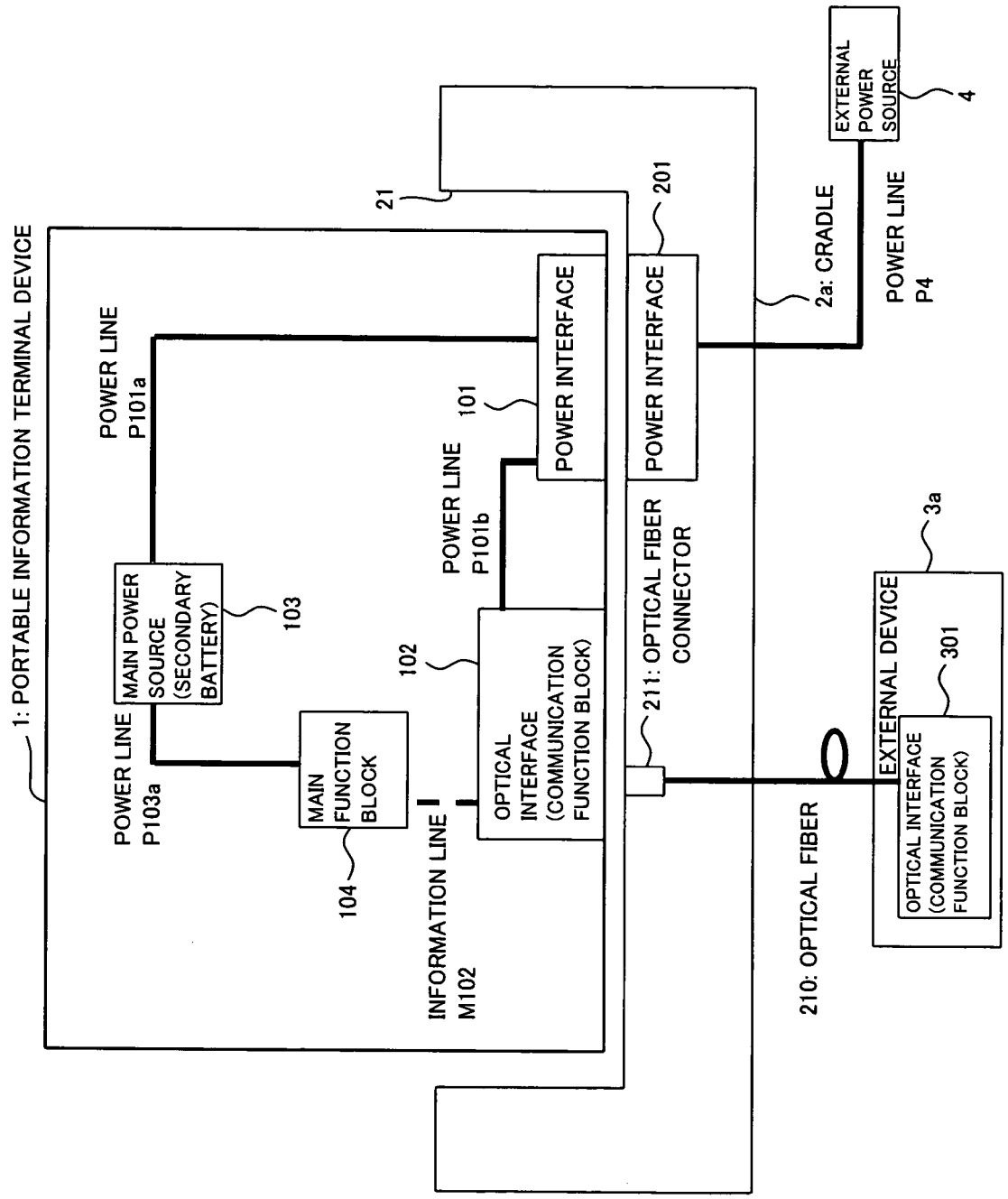
FIG. 5 is a block diagram showing a schematic configuration of a modified example of the portable information device and the cradle shown in FIG. 1.
Figure 6:
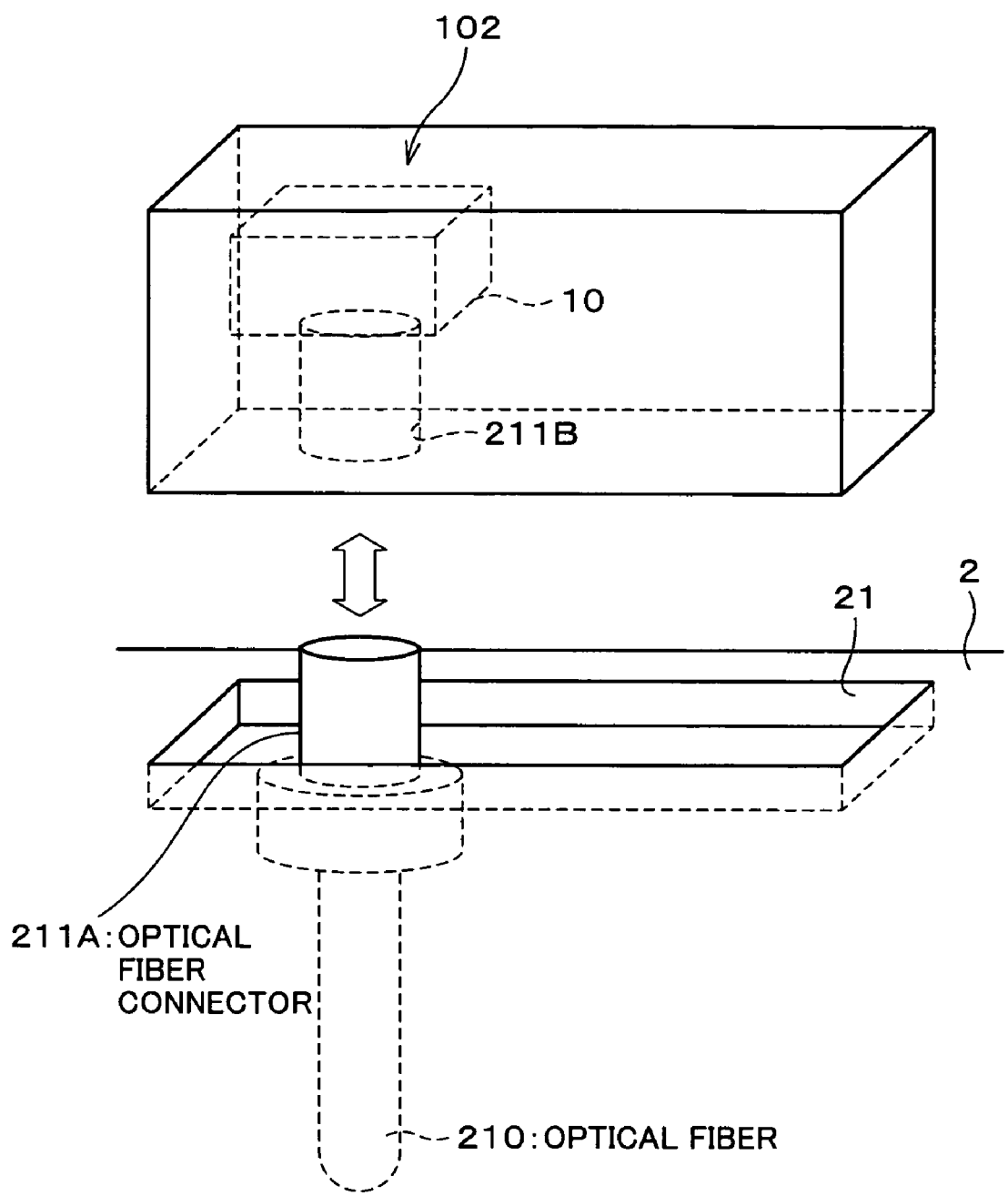
FIG. 6 is an explanatory diagram showing a schematic outline of connecting portion of the portable information device and the cradle shown in FIG. 5.

FIG. 5 is a block diagram showing schematic configuration of a cradle 2a using the optical fiber for connecting to an external device 3a. FIG. 6 is an explanatory diagram showing the connecting sections of the configuration shown in FIG. 5.

The cradle 2a differs from the cradle 2 in that an optical fiber connector 211A (see FIG. 5) serving as the connecting terminal of the optical fiber 210 is provided instead of the optical interface 202 (see FIG. 1). The other end of the optical fiber 210 is connected to an optical interface 301, the optical interface 301 serving as a communication function block of the external device 3a. As such, it is possible to carry out the optical communication between the portable information terminal device 1 and the external device 3a, via the optical fiber 210.

According to the configuration shown in FIG. 5, the cradle 2a does not carry out any signal conversion for the communication with the portable information terminal device 1. This is because the cradle 2a itself does not have a light transmitting and receiving unit. Therefore, the portable information terminal device 1 directly communicates with the external device 3a, with the use of the light emitted from the optical fiber connector 211A of the cradle 2a.

A connection for the optical communication is carried out as follows. When performing the optical communication, the portable information terminal device 1 is connected to the cradle 2, by jointing a recessed jointing section 211B of the portable information terminal device 1 and the optical fiber connector 211A which is protruded from a recessed section 21 of the cradle 2a. It should be noted that, when using the optical fiber 210, the communication can be performed as long as the optical fiber connector 211A is inserted into the recessed jointing section 211B. As such, an engagement of the guides 11 and 22 (see FIG. 2) does not require as much accuracy as the arrangement using the non-contact type optical interfaces.

Note that it is preferable that the portable information terminal device 1 and the cradle 2 include a protection mechanism so that the light emitting sections 11 of the optical interfaces 102 and 202 do not face each other, and so that the light receiving sections 12 of the interfaces 102 and 202 do not face each other. For example, the recessed jointing section 21 of the cradle 2 may include a projection for preventing the portable information terminal device 1 from being placed in a wrong position.

Further, it is preferable that the portable information terminal device 1 and the cradle 2 include a protection mechanism for preventing the portable information terminal device 1 and the cradle 2 from being separated during the data communication. For example, there may be provided an unguiform member that projects from the cradle 2 for catching the portable information terminal device 1 during the data communication, and for retracting itself when the data communication finishes.

Next described is operations of the portable information terminal devices 1 (1b, 1d) and the cradle 2 (2a, 2c, 2d, 2e).

As shown in FIG. 1, the cradle 2 detects the connection of the portable information terminal device 1 to the cradle 2, based on an electrical connection of the power interface 201 with the power interface 101. When the connection is detected, the optical interface 102 receives the power via the power line P101b, and then the optical interfaces 102 and 202 start the optical communication.

Figure 7:
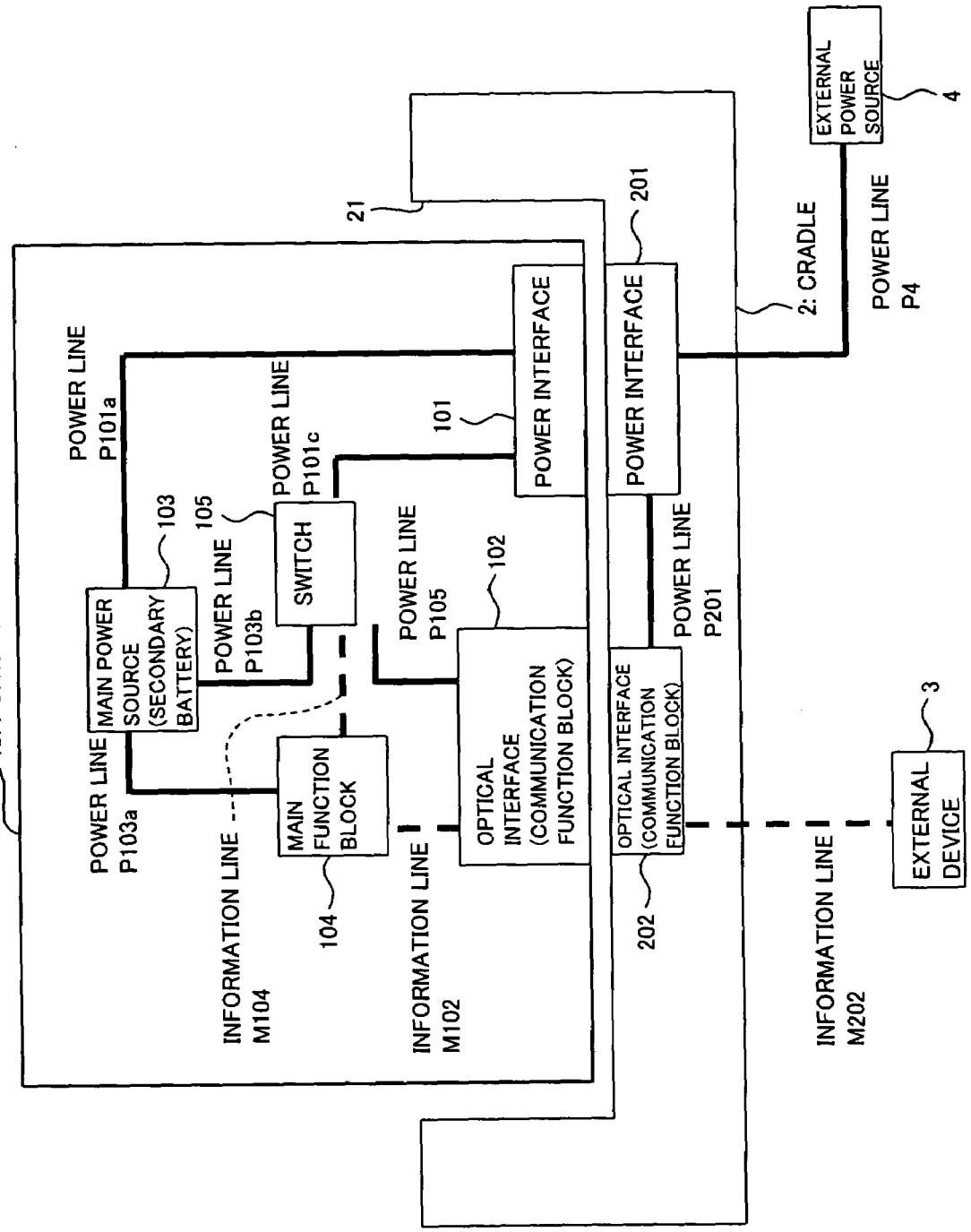
FIG. 7 is a block diagram showing a schematic configuration of another modified example of the portable information device and the cradle shown in FIG. 1.

Shown in FIG. 7 is an explanatory diagram of a configuration in which the power is supplied from the main power source to the optical interface 102.

A portable information terminal device 1b shown in FIG. 7 differs from the portable information terminal device 1 shown in FIG. 1 in that (i) power lines P101c, P103b, and P105, an information line M104, and a changeover switch (switching means) 105 are further provided, (ii) the power line P101 between the power interface 101 and the optical interface 102 is removed.

While the power interfaces 101 and 201 are connected to each other, the switch 105 connects the line P101c with the power line P105. While the power interfaces 101 and 201 are disconnected from each other, the switch 105 connects the power line P103b and the power line P105.

As such, in the portable information terminal device 1*b*, the optical interface 102 receives the power from the main power source 103, via the power lines P101*c* and P105, while the cradle 2 is not connected. While the cradle 2 is connected, the optical interface 102 receives the power from the external power source 4 via the power interfaces 201 and 101, and the power lines P101*c* and P105.

Therefore, it is possible to suppress the power consumption in the main power source 103. Further, the portable information terminal device 1*b* can perform the data communication with the external device 3, while the cradle 2 is not connected to the portable information terminal device 1*b*. It should be noted that, in this case, it is assumed that the external device 3 includes an optical interface (not shown) equivalent to the optical interface 202 so as to directly communicate with the optical interface 102.

The connection between the portable information terminal device 1*b* and the cradle 2 can be detected based on (i) the connection between the power interface 101 and the power interface 201, (ii) the connection between the optical interface 102 and the optical interface 202, or (iii) a result detected by a detection switch (later described detection switch 203 shown in FIG. 8). In response to a detection signal indicating the connection thus obtained, the main function block 104A sends a switching control signal to the switch 105, via the information line M104*a*.

Figure 8:
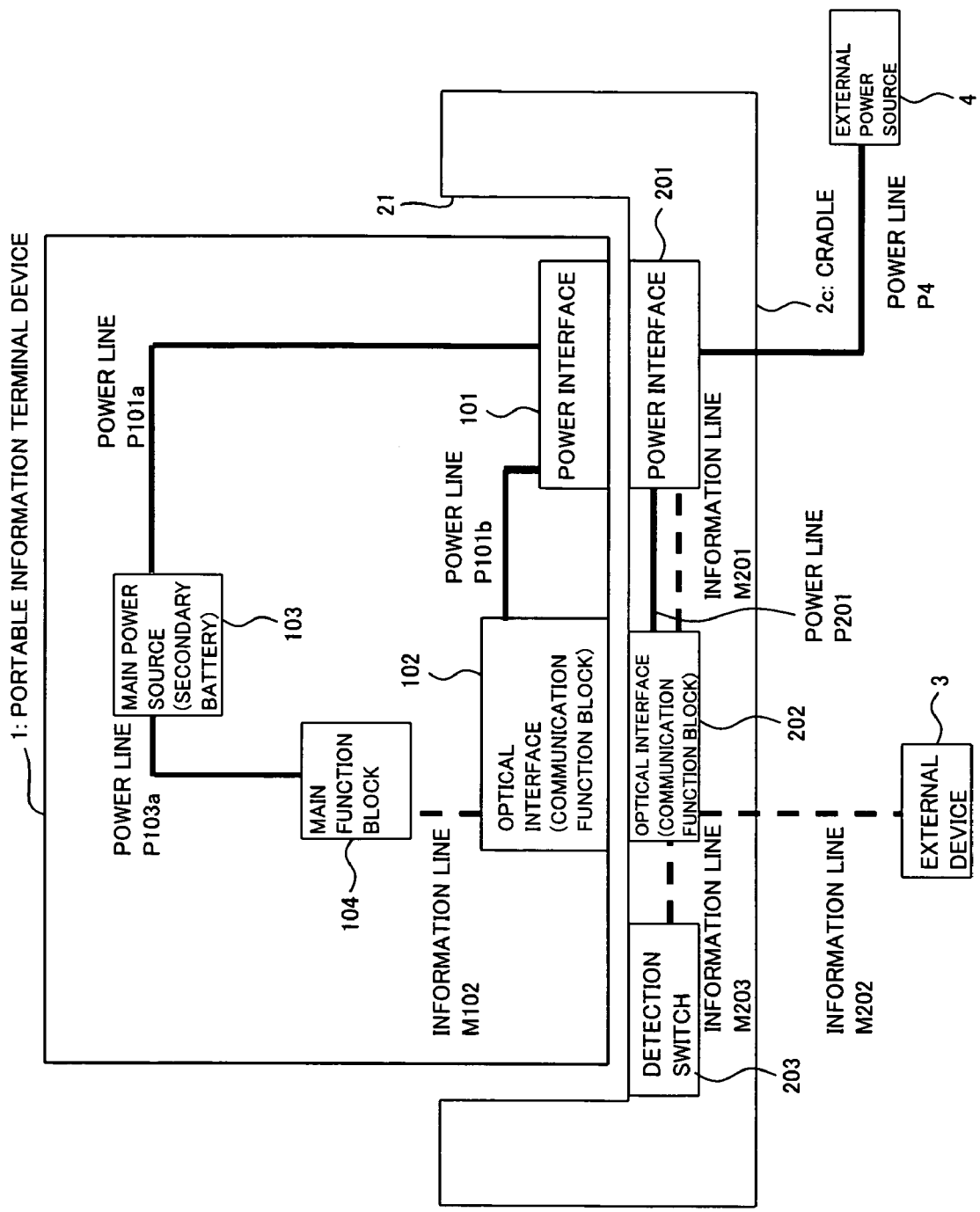
FIG. 8 is a block diagram showing a schematic configuration of a further modified example of the portable information device and the cradle shown in FIG. 1.
Figure 9:
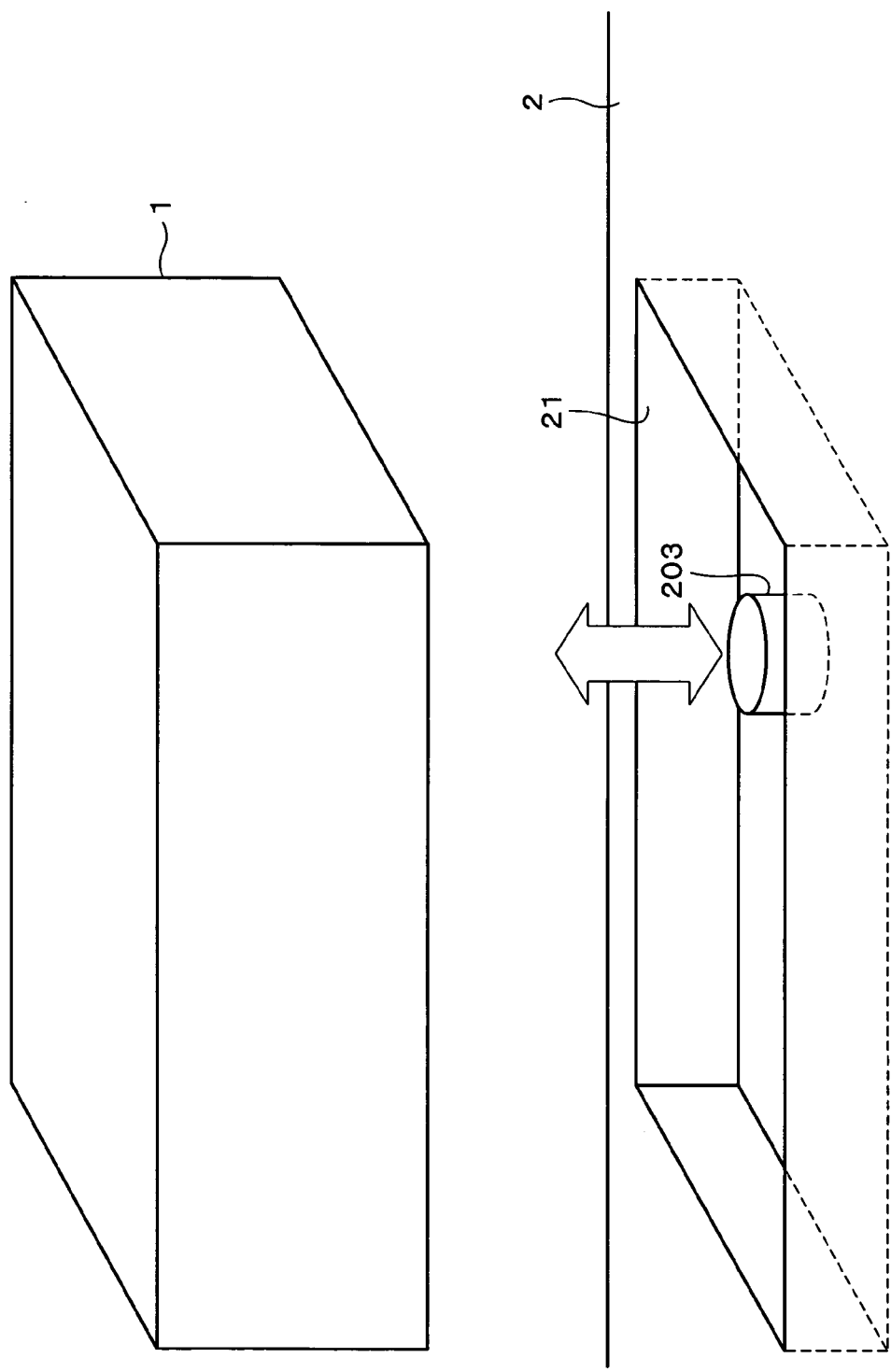
FIG. 9 is an explanatory diagram showing a schematic outline of connecting portion of the portable information device and the cradle shown in FIG. 8.

FIG. 8 is an explanatory diagram showing a configuration of a cradle 2*c* including a detection switch 203 for detecting a connection with the portable information terminal device 1. FIG. 9 is an explanatory diagram showing an exterior appearance of the detection switch 203.

The cradle 2*c* shown in FIG. 8 differs from the cradle 2 shown in FIG. 1 in that the detection switch (detecting means) 203, and information lines M201 and M203 are further provided.

As shown in FIG. 9, the detection switch 203 is, for example, a mechanical switch, such as a push button or the like, which is provided in the recessed section 21. This detection switch 203 detects the connection of the portable information terminal device 1 to the cradle 2*c*. A detection signal, from the detection switch 203, is supplied to the optical interface 202 and the power interface 201, via the information line M203. This causes the power interface 201 to supply the power from the external power source 4 to the power interface 101 and the optical interface 202, thereby allowing the optical interfaces 102 and 202 to perform the data communication. It should be noted that the detection switch 203 may be other types of switches such as an optical switch, instead of the mechanical switch.

The detection switch 203 also detects a separation of the portable information terminal device 1 from the cradle 2*c*. In accordance with a detection signal detected by the detection switch 203, the power interface 201 stops supplying the power to the power interface 101 and to the optical interface 202. This causes the end of the data communication between the optical interfaces 102 and 202.

The following description deals with control which is carried out during the connection or separation between the portable information terminal device 1 and the cradle 2. The following describes, in sequence, the detection of the connection and the separation (disconnection) between the portable information terminal device 1*b* and the cradle 2, based on (1) the power interface, (2) the optical interface, and (3) the detection switch.

(1) Power Interface

The power interface 201 of the cradle 2 includes a mechanism in which a voltage at a contact point is monitored. This mechanism monitors a change in the voltages which occurs when the power interface 201 is connected to or separated from a contact point of the power interface 101 in the portable information terminal device 1. When the mechanism detects a change, it judges the occurrence of the connection or separation between the portable information terminal device 1 and the cradle 2.

Figure 10:
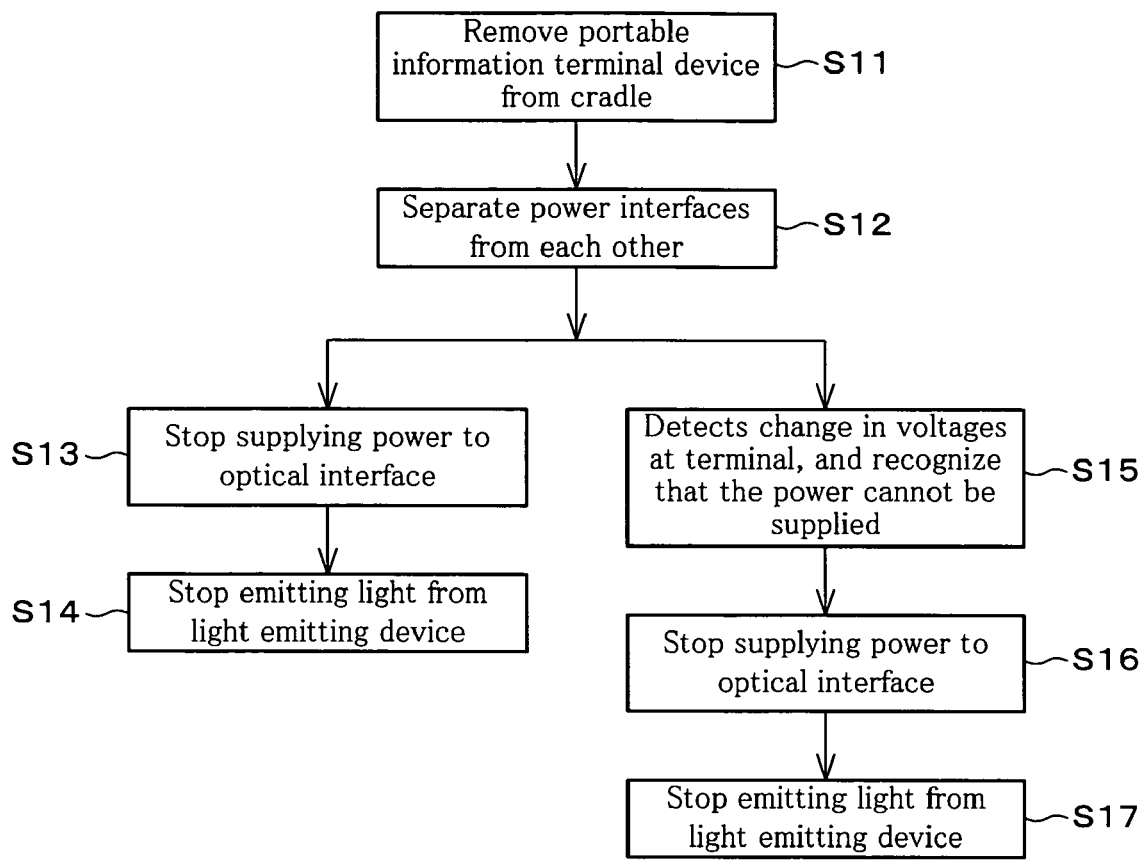
FIG. 10 is a flow chart showing a process in which the portable information device and the cradle shown in FIG. 1 detect the separation of the portable information terminal device from the cradle via a power interface, and control and stop a driving of an optical interface.

FIG. 10 is a flow chart showing a process, in which the power interface 201 stops driving the optical interfaces 102 and 202, when detecting the separation of the portable information terminal device 1 from the cradle 2.

First, when a user removes the portable information terminal device 1 from the cradle 2 (S11), the power interfaces 101 and 201 are separated from each other (S12).

In the portable information terminal device 1, no power is supplied to the optical interface 102 via the power line P101*b*, when the power interface 101 is separated from the power interface 201 (S13). This causes the light emitting device (light emitting section 11) to stop emitting the light (S14).

In the cradle 2, when the power interface 101 is separated from the power interface 201, the power interface 201 detects a change in the voltages at the terminal, and recognizes that the power cannot be supplied to the power interface 101 (S15). Then, the power interface 201 stops the power supply to the optical interface 202 (S16). This causes the light emitting device (light emitting section 11) of the optical interface 202 to stop emitting the light, the optical interface 202 being in a state in which the power is no longer supplied via the power line P201 (S17).

As described above, it is possible to stop driving the optical interface 202 of the cradle 2, by detecting the separation of the portable information terminal device 1 from the cradle 2 via the power interface 201.

(2) Optical Interface

Each of the optical interfaces 101 and 201 transmits a periodical recognition signal (tone signal) to recognize the opposed optical interface of the other optical interface. When one of the optical interfaces 102 and 202, which transmits the tone signal, receives no returning tone signal from the other one of the optical interfaces 102 and 202, such one of the optical interfaces 102 and 202 recognizes that the other one of the optical interfaces 102 and 202 is not in a state where the communication can be carried out, i.e., recognizes that the portable information terminal device 1 and the cradle 2 are separated from each other.

Figure 11:
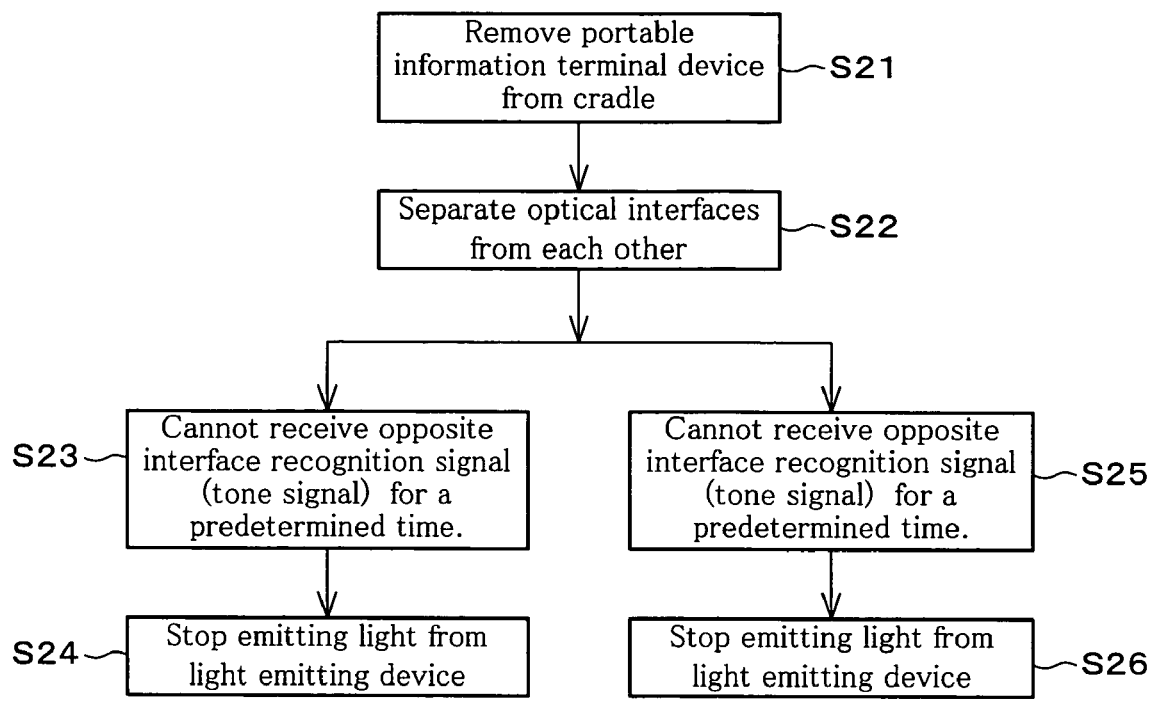
FIG. 11 is a flow chart showing a process in which the portable information device and the cradle shown in FIG. 1 detect the separation of the portable information terminal device from the cradle via an optical interface, and control and stop a driving of the optical interface.

FIG. 11 is a flow chart showing a process in which the optical interfaces 101 and 202 stop driving the optical interfaces 102 and 202, when detecting the separation of the portable information terminal device 1 from the cradle 2.

First, when a user removes the portable information terminal device 1 from the cradle 2 (S21), the power interfaces 101 and 201 are separated from each other (S22).

At this point, in the portable information terminal device 1, the optical interface 102 cannot receive a recognition signal from the optical interface 202 (S23). As a result, the optical interface 102 recognizes that the portable information terminal device 1 and the cradle 2 are separated from each other. This causes the light emitting device (light emitting section 11) to stop emitting the light (S24).

At the same time, in the cradle 2, the optical interface 202 cannot receive the recognition signal from the optical interface 102 (S25). As a result, the optical interface 202 recognizes that the portable information terminal device 1 and the cradle 2 are separated from each other. This causes the light emitting device (light emitting section 11) to stop emitting the light (S26).

As described above, it is possible to stop driving the optical interfaces 102 and 202 by detecting the separation of the portable information terminal device 1 from the cradle 2 via the optical interfaces 102 and 202.

(3) Detection Switch

The detection switch 203 is pressed down when the portable information terminal device 1 and the cradle 2c are connected with each other, whereas the detection switch 203 is freed from being pressed down when the portable information terminal device 1 and the cradle 2c are separated from each other, for example. This allows the connection or separation between the portable information terminal device 1 and the cradle 2c.

Figure 12:
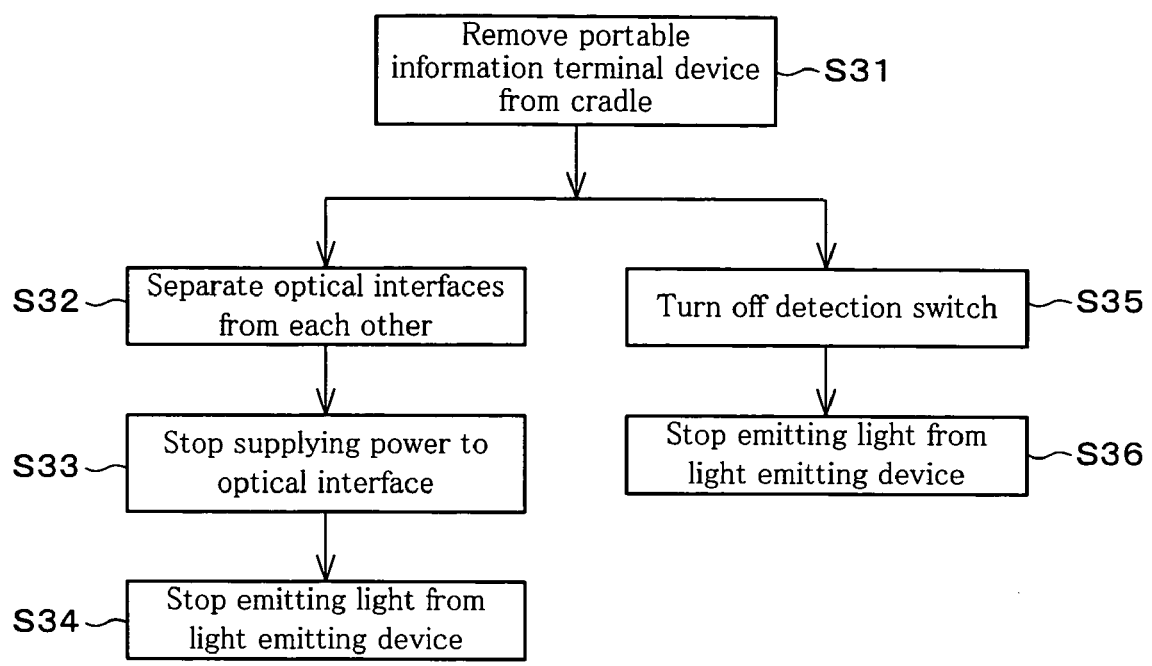
FIG. 12 is a flow chart showing a process in which the portable information device and the cradle shown in FIG. 8 detects the separation of the portable information terminal device from the cradle via a detection switch, and controls and stops the optical interfaces.

FIG. 12 is a flow chart showing a controlling process in which the driving of the optical interface 202 of the cradle 2c is stopped by detecting, with the use of the detection switch 203, the separation of the portable information terminal device 1 from the cradle 2c.

When the user removes the portable information terminal device 1 from the cradle 2c (S31), the detection switch 203 is turned off in the cradle 2c (S35). The detection switch 203 outputs a detection signal to the optical interface 202 via the information line 203. As such, the optical interface 202 causes the light emitting device (light emitting section 11) to stop the light emission (S36).

At this point, in the portable information terminal device 1, the power interface 101 is separated from the power interface 201 (S32). As such, no power is supplied to the optical interface 102, via the power interface 101 (S33). This causes the light emitting element (light emitting section 11) of the optical interface 102 to stop emitting the light (S34).

As described above, it is possible to stop driving the optical interface 202 by detecting the separation of the portable information terminal device 1 from the cradle 2c, with the use of the detection switch 203. It should be noted that the portable information terminal device 1 may include a detection switch like the detection switch 203 so that the driving of the optical interface 102 is stopped in accordance with a detection signal detected by such a detection switch.

As also described above, it is preferable that the portable information terminal device 1 and the cradle 2 respectively include a protection mechanism (not shown) for preventing the portable information terminal device 1 and the cradle 2 from separating from each other during the data communication. In this case, it is possible to detect connection or separation between the portable information terminal device 1 and the cradle 2 in response to the protection mechanism. For example, when the portable information terminal device 1 is connected to the cradle 2, the optical interface 102 and 202 may be control-led so as to perform the data communication after activation of the protection mechanism is confirmed.

Figure 13:
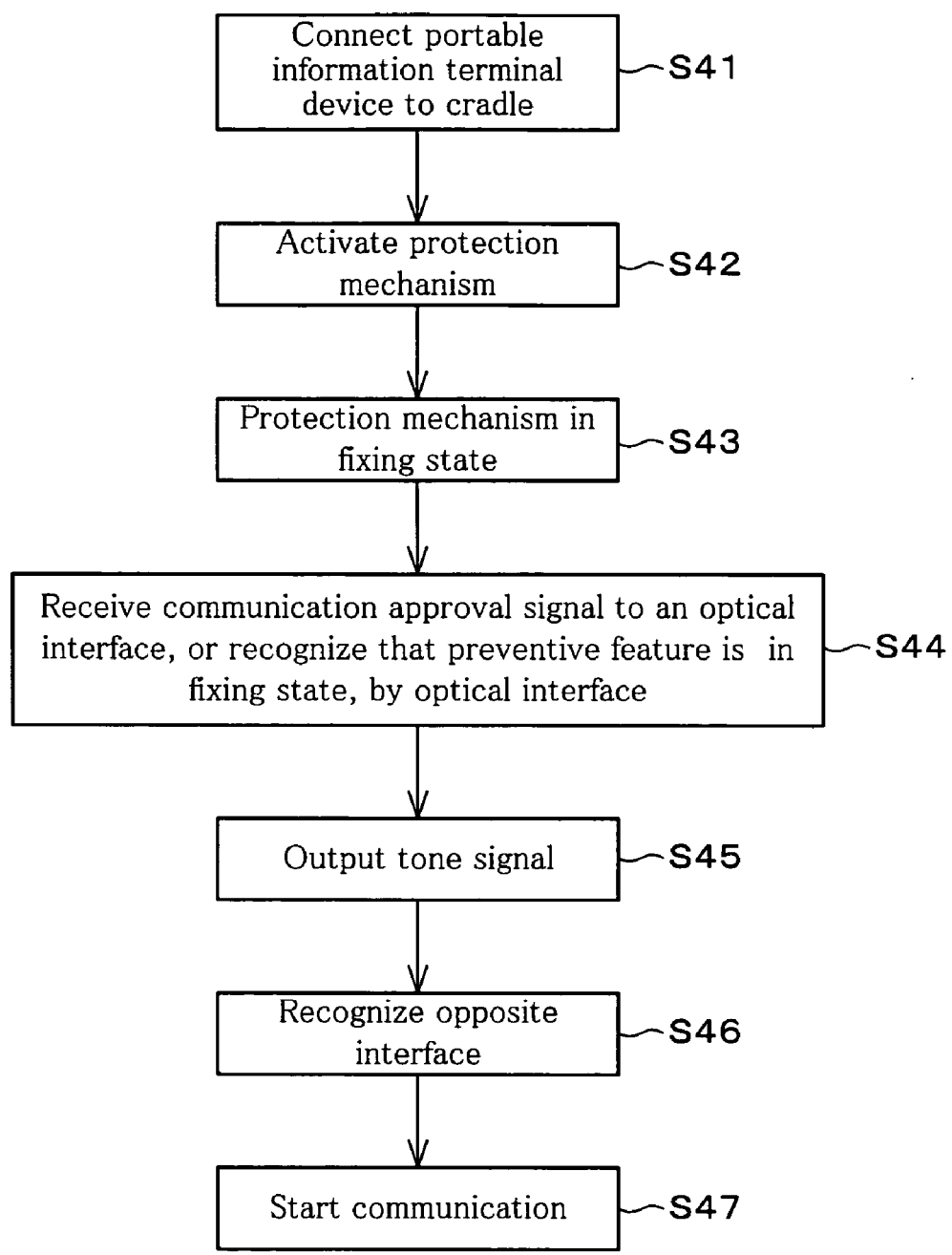
FIG. 13 is a flow chart showing a process in which the portable information device and the cradle shown in FIG. 1 detects the connection of the portable information terminal device with the cradle in accordance with a status of a protection mechanism, and controls and starts data communication.

FIG. 13 is a flow chart showing a process in which a communication starts, after the connection between the portable information terminal device 1 and the cradle 2 is detected in response to the protection mechanism.

As shown in FIG. 13, when the portable information terminal device 1 is connected to the cradle 2 (S41), the protection mechanism is activated (S42). This causes the portable information terminal device 1 to fix to the cradle 2 (S43). At this point, the optical interfaces 102 and 202 respectively receive a communication approval signal from the protection mechanism, or recognize that the protection mechanism is in a fixing state (S44). Then, the optical interfaces 102 and 202 output the tone signal for recognition (S45) to recognize each other (S46). After the recognition, the communication starts (S47).

Figure 14:
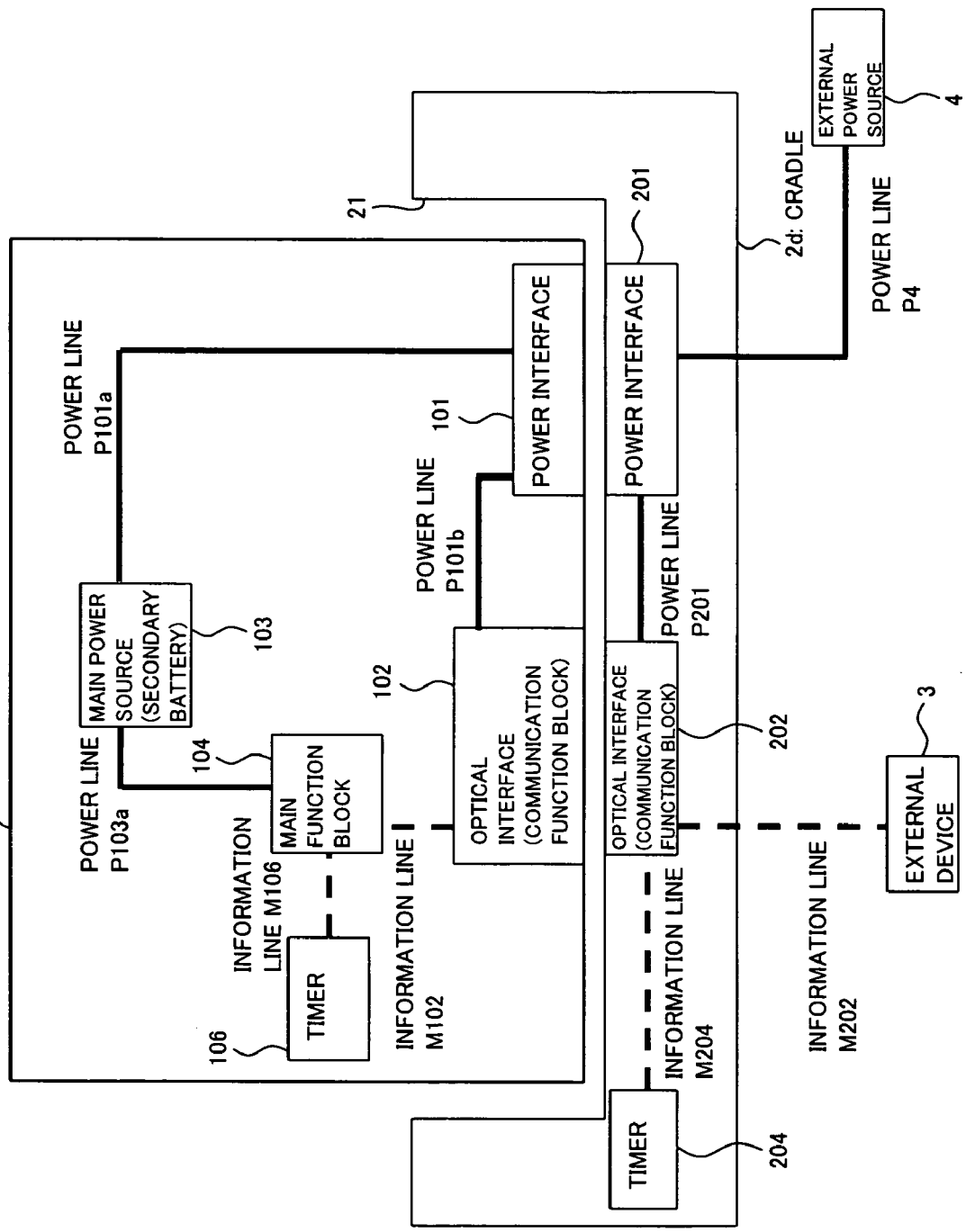
FIG. 14 is a block diagram showing a schematic configuration of still a further modified example of the portable information device and the cradle shown in FIG. 1.

FIG. 14 is an explanatory diagram showing a cradle 2d including a timer 204. A portable information terminal device 1d shown in FIG. 14 differs from the portable information terminal device 1 shown in FIG. 1, in further including a timer 106, and an information line M106. A cradle 2c shown in FIG. 14 differs from the cradle 2 shown in FIG. 1, in further including a timer 204 and an information line M204.

When the user connects the portable information terminal device 1 to the cradle 2, the user usually needs time for confirming the connection, and/or for correcting a position, after the power interfaces 101 and 201 are connected to each other, and after the optical interfaces 102 and 202 are connected to each other. If the optical interfaces 102 and 202 start communicating before the user completes the connecting operation, then a quality of the communication deteriorates.

In view of the deficiency, the portable information terminal device 1d and the cradle 2d carry out the following so that the bad quality communication is not carried out. Namely, the optical interfaces 102 and 202 first confirm that they are connected to their opposite optical interfaces, respectively. Then, the communication starts after elapsing of a predetermined period of time to which the user sets as setting time of the timers 106 and 204. It should be noted that the predetermined period of time is preliminary set, based on the time needed for a typical user to complete the connection of the portable information terminal device 1d to the cradle 2d.

Figure 15:
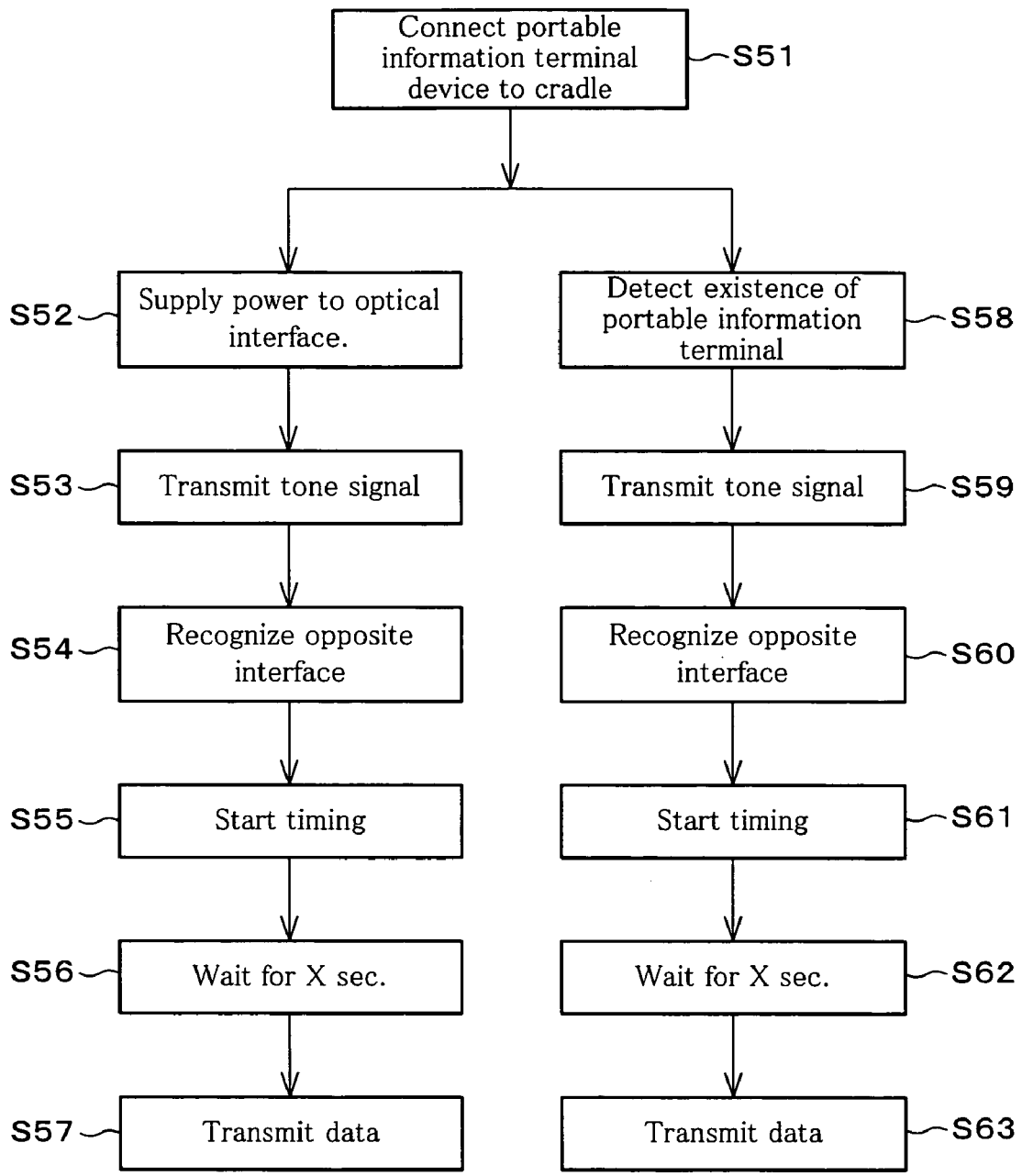
FIG. 15 is a flow chart showing a process in which the portable information device and the cradle shown in FIG. 14 control starting of data communication with the use of a timer.

FIG. 15 is a flow chart showing a process for starting the communication, after detecting the connection between the portable information terminal device 1d and the cradle 2d.

As shown in FIG. 15, when the portable information terminal device 1d is connected to the cradle 2d (S51), the power is supplied to the optical interface 102 (S52) in the portable information terminal device 1d. This allows the optical interface 102 to transmit the tone signal for recognition to the optical interface 202 (S53), and recognizes the opposite optical interface 202 (S54). Then, the optical interface 102 causes the timer 106 to start timing (S55). After elapsing of the predetermined period of time ($\chi$ sec.) (S56), the optical interface 102 starts data transmission to the optical interface 202 (S57).

In the cradle 2d, the existence of the portable information terminal device 1d is detected (S58), when the portable information terminal device 1 is connected to the cradle 2d (S51). This causes the optical interface 202 to transmit the tone signal for recognition (S59) to the optical interface 102, and to recognize the opposite optical interface 102 (S60). Then, the optical interface 202 causes the timer 204 to starts timing (S61). After elapsing of the predetermined period of time ($\chi$ sec.) (S62), the optical interface 202 starts the data transmission to the optical interface 102 (S63).

Thus, the portable information terminal device 1d and the cradle 2d can automatically start the communications, after elapsing of the predetermined period of time needed for the user to complete the connection of the portable information terminal device 1d to the cradle 2d. As such, it is possible to efficiently perform a high-quality communication.

It may be possible for the portable information terminal device 1d and the cradle 2d to suspend the light emission of the light emitting devices (light emitting section 11) in the optical interfaces 102 and 202, when the portable information terminal device 1d and the cradle 2d do not carry out any communication for a period of time not shorter than a predetermined period of time to which the user sets as setting time of the timer 106 and/or the timer 204, even though the portable information terminal device 1*d* and the cradle 2*d* are connected to each other. This allows the reduction of the power consumed by the optical interfaces 102 and 202.

Figure 16:
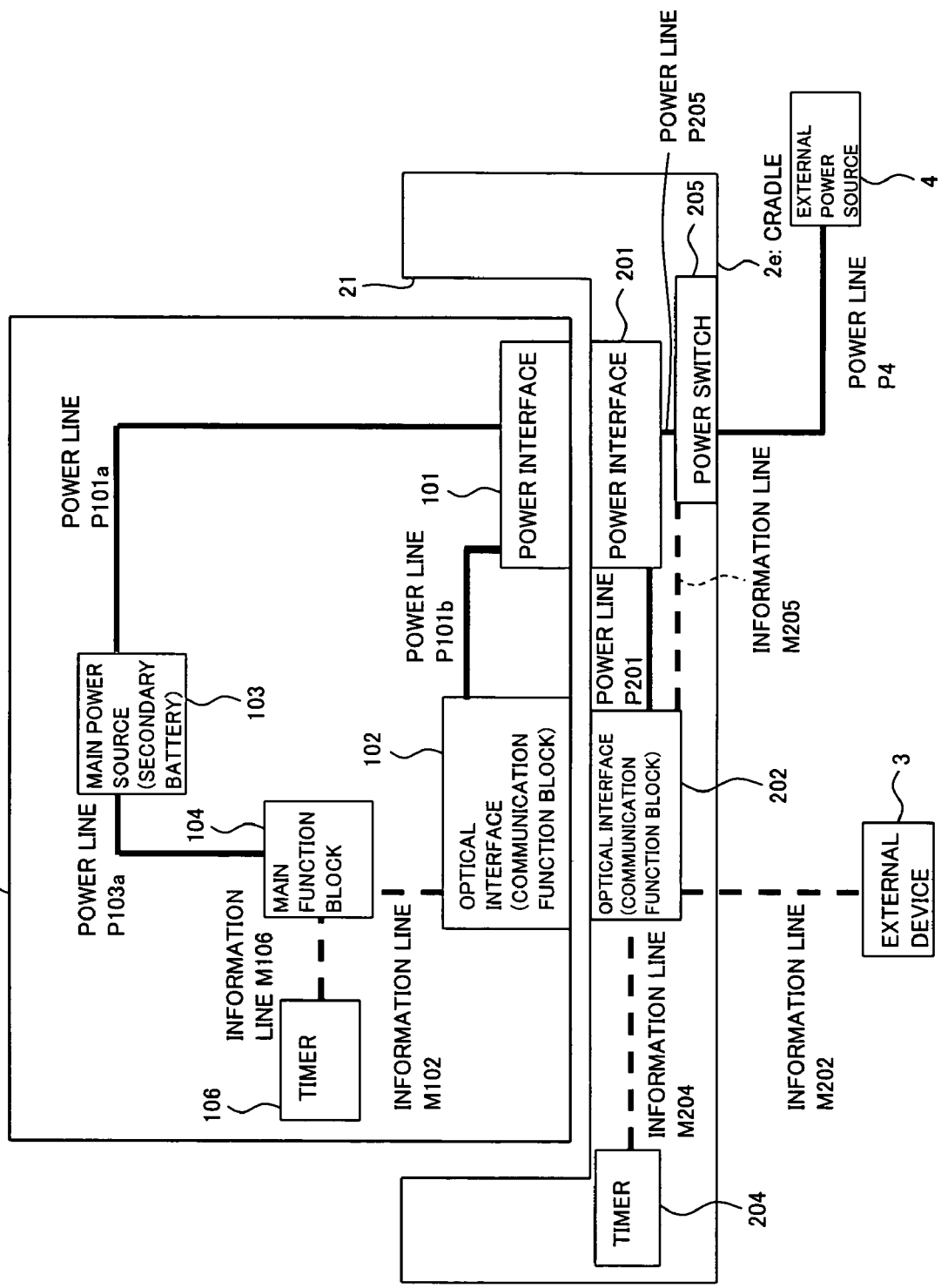
FIG. 16 is a block diagram showing a schematic configuration of yet a further modified example of the portable information device and the cradle shown in FIG. 1.

Next, FIG. 16 is an explanatory diagram showing a configuration of the cradle 2*e*, in which a power switch 205 is provided between the external power source 4 and the power interface 201, the power switch 205 being connected to the power interface 201 via a power line P205, and the power switch 205 being connected to the external power source 4 via the power line P4. The cradle 2*e* shown in FIG. 16 differs from the cradle 2*d* shown in FIG. 14, in further including the power switch 205, and an information line M205.

With the arrangement, the portable information terminal device 1*d* and the cradle 2*e* can use the built-in timers 106 and 204 to measure time during which no communication is carried out, while the portable information terminal device 1*d* and the cradle 2*e* are connected to each other. When the predetermined period of time elapses without any communication, the optical interfaces 102 and 202 can suspend the light emission of the respective light emitting devices (light emitting sections 11), respectively.

Further, a trigger signal from the external device 3 causes the cradle 2*e* to resume the light emitting of the light emitting device (light emitting section 11) in the optical interface 202. The trigger signal also causes the cradle 2*e* to send a control signal to the power switch 205 so that the power interface 201 turns on/off the power supply to the power interface 101. This allows resumption of the power supply to the optical interface 102 while suspending the light emission of the light emitting device (light emitting section 11) in the optical interface 102. As such, it is possible to resume the light emission of the light emitting device (light emitting section 11) in the optical interface 102.

Figure 17:
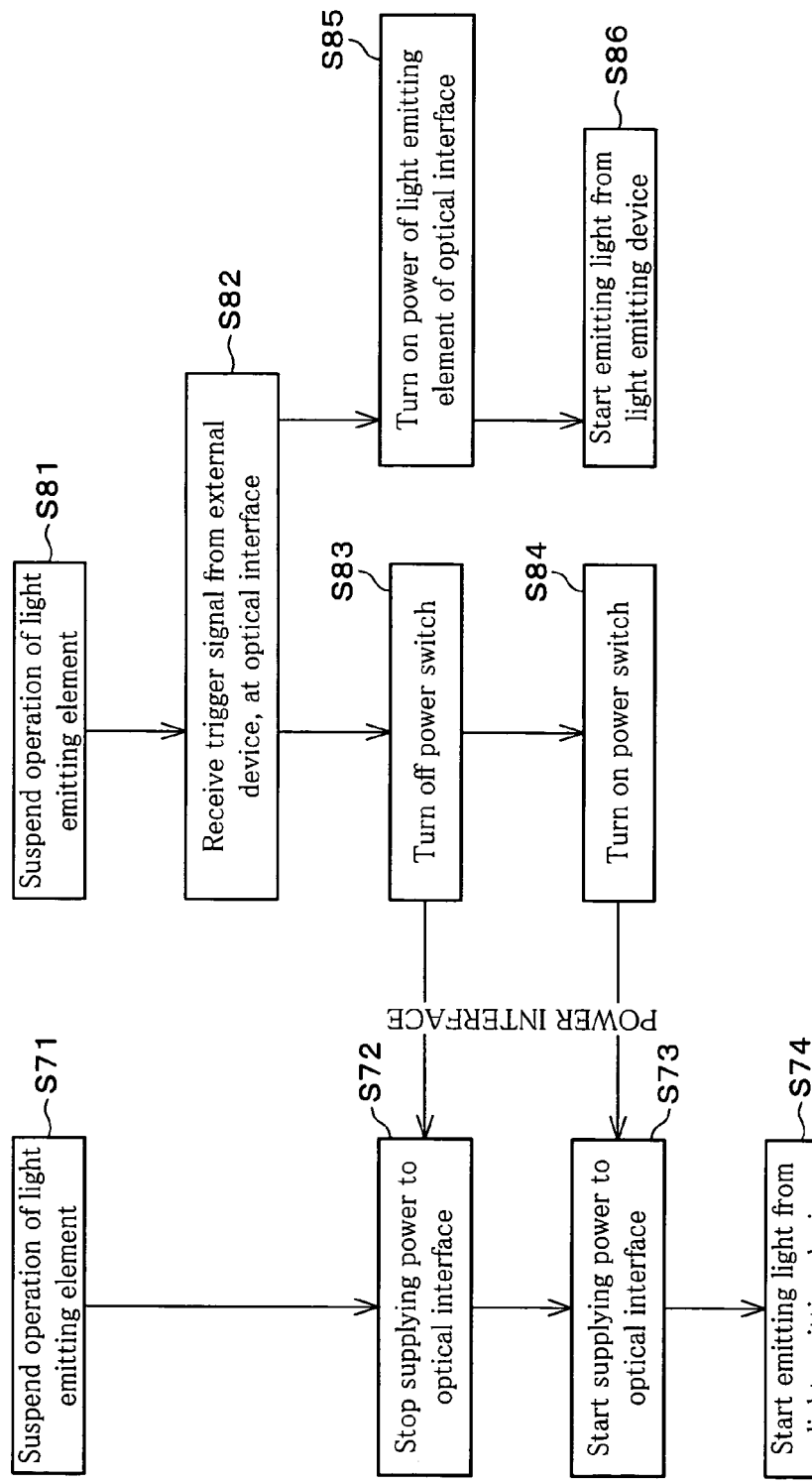
FIG. 17 is a flowchart showing a process in which the portable information device and the cradle shown in FIG. 14 controls resuming of data communication with use of a power switch.

FIG. 17 is a flow chart showing a process for resuming the light emission of the light emitting devices of the respective optical interfaces 102 and 202, in the portable information terminal device 1*d*. FIG. 17 deals with a case of resuming the optical communication in a situation where (i) the operations of the light emitting device and the light receiving device of the optical interface 202 in the cradle 2*e* are respectively suspended and (ii) the operations of the light emitting device and the light receiving device of the optical interface 102 in the portable information terminal device 1*d* are respectively suspended.

First, in the cradle 2*e*, when the operation of the light emitting device in the optical interface 202 is suspended (S81), the optical interface 202 receives the trigger signal from the external device 3 (S82). When the optical interface 202 receives the trigger signal in the step S82, the power of the light receiving/emitting module 10 is turned on (S85). Then, the light emitting device (light emitting section 11) starts emitting the light (S86). Further, when the optical interface 202 receives the trigger signal in the step S82, the power switch 205 is turned off (S83), and is then turned on (S84).

On the contrary, in the portable information terminal device 1*d*, when the operation of the light emitting element in the optical interface 102 is suspended (S71), the power supply from the power interface 101 is stopped (S72), and is then started (S73), in accordance with the steps S83 and S84 associated with the cradle 2*e*. This allows the light emitting device (light emitting section 11) to start emitting the light (S74).

By stopping, and then resuming the power supply to the optical interface 102 in the portable information terminal device 1*d*, it is possible to start the light emission of the lighting element. In this case, it is assumed that the light emitting device (light emitting section 11) in the portable information terminal device 1*d* is arranged so that the starting of the power supply triggers the light emission of the light emitting device (light emitting section 11). Further, in the optical interface 102, (i) the power supply of the power to the light receiving device is resumed, and (ii) the light emitting device starts the light emission. As such, the operation of the optical interface 102 is resumed.

It is thus possible to suspend the light emitting device and the light receiving device in the cradle 2*e*, along with the light emitting device and the light receiving device in the portable information terminal device 1*d*. As such, it is not necessary to supply the power to the optical interface 102. This allows the reduction of the power consumption.

Alternatively, it is also possible to resume the operations of the light emitting device and the light receiving device of the portable information terminal device 1*d*, by further including a metal signal line for detecting the trigger signal, and by carrying out the supply of the trigger signal via the metal signal line.

Further, only the light receiving device of the optical interface 102 in the portable information terminal device 1*d* may continue its operation, instead of suspending the operations of the light emitting device and the light receiving device of the cradle 2*e*, and instead of suspending the operations of the light emitting device and the light receiving device of the portable information terminal device 1*d*.

In this case, when the light emitting device of the cradle 2*e* starts emitting the light in response to the trigger signal, the light receiving device of the portable information terminal device 1*d* detects the light emission from the light emitting device of the cradle 2*e*. This causes the power supply to the light emitting device of the portable information terminal device 1*d* so that the light emitting device starts emitting the light. It is needless to say that, in the cradle 2*e*, (i) the light receiving device resumes the operation, and (ii) the light emitting device starts the light emission in response to the trigger signal.

Thus, it becomes unnecessary to turn off the power switch 205 (S83) as shown in FIG. 17, thereby simplifying the operation. Further, in the portable information terminal device 1*d*, the power is supplied to the light receiving device, even when the operation of the light emitting device is suspended. Note that the power is supplied from the cradle 2*e*, not from the main power source 103. As such, this power consumption has nothing to do with the main power source 103.

Finally, described is an example of the configurations, and the control, of the optical interfaces 102 and 202.

Figure 18:
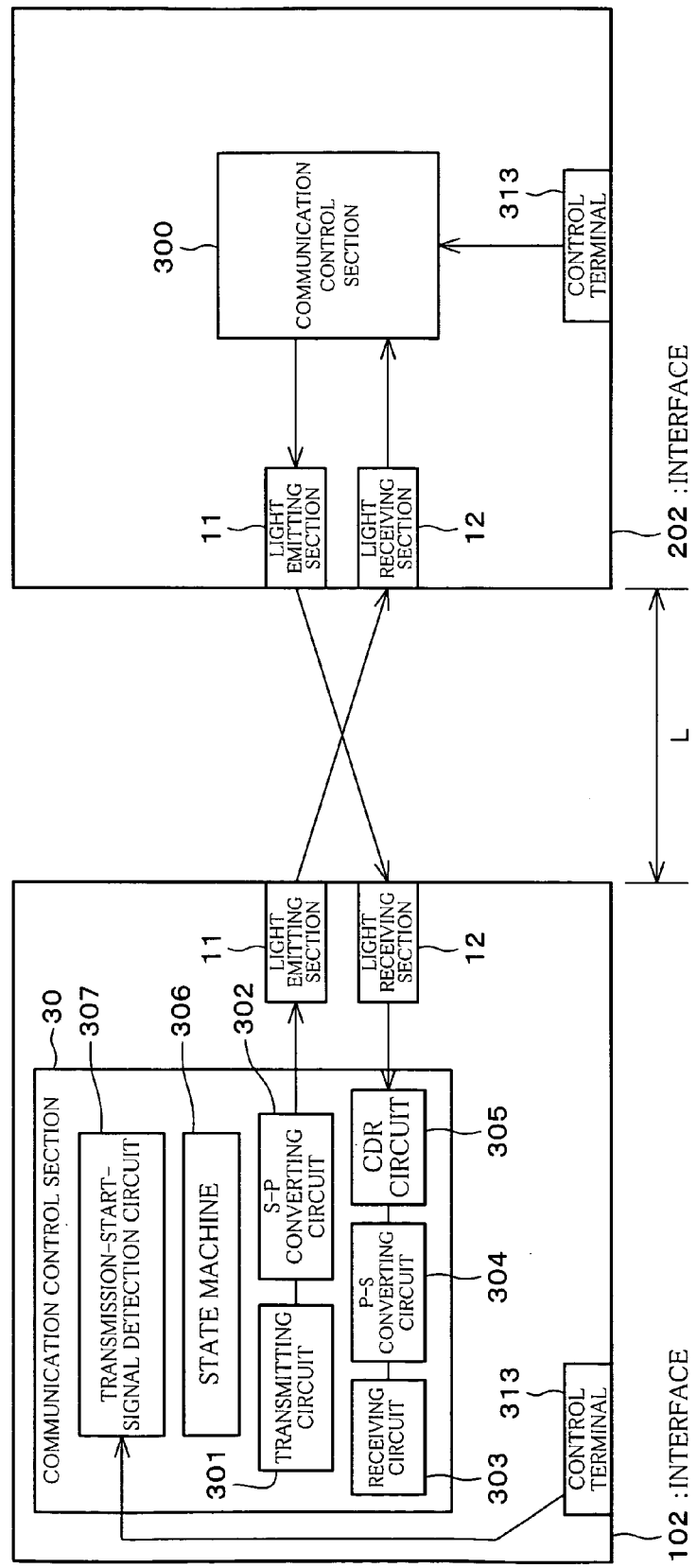
FIG. 18 is a block diagram showing an example of configuration of the optical interfaces in the portable information terminal device and the cradle shown in FIG. 1.

FIG. 18 is a block diagram showing the exemplary configuration of the optical interface 102 and 202. It should be noted that the description deals with only the optical interface 102, because the configurations of the optical interfaces 102 and 202 are basically the same.

As shown in FIG. 18, the optical interface 102 performs full-duplex space transmission with the use of light having the same wavelength. As such, the optical interface 102 includes a communication control section 300, the light emitting section 11, the light receiving section 12, and a control terminal 313.

For example, it is possible to achieve a communication speed of faster than 50 Mbps to 100 Mbps, by (i) arranging the optical interfaces 102 and 202 as shown in FIG. 18 with the use of an optical transceiver and a communication IC, both compliant with the communication speed, and (ii)

controlling the optical interfaces 102 and 202 as follows. Namely, it becomes possible to carry out the optical space communication at a communication speed faster than IrDA (several Mbps).

For example, the optical interface 102 is controlled as follows. The optical interface 202 is controlled likewise.

Firstly, using a Signal Detect (SD) signal (reception detecting signal), which inevitably responds to the optical signal from a second device (an addressee) and not inevitably respond to the optical signal of a first device (an addresser), the first device confirms the presence of the second device in accordance with the timing of the SD signal and in accordance with the time during which the first device emits the light. Further, the first device and the second device have respective different parameters in accordance with the SD timing.

The optical interface 102 generates a binary signal (hereinafter referred to as SD signal). The SD signal becomes active during receiving the signals (during transmitting the tone signal, and during receiving the ordinary data signal). The SD signal becomes non-active, when the connection of the optical interface 102 is disconnected (more specifically, (i) when a connection to the second device is physically disconnected, or (ii) when the second device is unable to transmit the signal because the power is turned off. This is because the optical interface 102 cannot receive the signal from the second device. Thus, the SD signal allows the detection of the disconnection (the releasing of the connection) with ease. Further, when switching the transmitted signal from the tone signal to a continuous data communication signal, the SD signal continuously becomes active. This allows the addressee to easily detect the starting of the data communication of the addresser. Incidentally, the SD signal is also adopted by IEEE p1394b standard so that the disconnections between apparatuses are detected.

It should be noted that the tone signal from an addresser; i.e., the SD signal for an addressee is a sequence of pulses having a relatively fast cycle, and the duration of the pulses is a predetermined period of time. For example, a pattern of "01010101" continues for 2 ms at approximately 25 MHz, and then stops for a while. An amplifier on the receiving side sends the SD signal to the control-use IC, when receiving a signal which changes at a frequency in a predetermined frequency band or at a higher frequency. The reason for setting such predetermined frequency band or a higher frequency, is for avoiding mistakenly recognizing the light entered at a slow frequency such as the frequency of the disturbance light (for example, the fluorescent light) as the light emitted from the second device (the opposite device).

When the optical interface 102 is connected, two kinds of tone signals are used. The tone signals have respective lengths which are different from each other. One of the two kinds of tone signals is used for (i) "confirming the second device", and the other is used for (ii) "requesting the communication start". More specifically, for example, a short tone signal (e. g. 2 ms) is used for confirming the second device ("confirming the second device"), and a long tone signal (5 ms or longer) is used for requesting the starting of the communication ("requesting the communication start").

When the optical interface 102 is connected, the short tone signals are first exchanged. When a predetermined number of the short tone signals are exchanged as required, the presence of the second device (opposite device) is affirmed.

Then, at the timing of outputting the next tone signal, the optical interface 102 (device A) for requesting the starting of the communications outputs the long tone signal. When receiving the long tone signal, a device B (the optical interface 202) confirms that the second device (the opposite device A) is requesting the starting of the communication. At this point, the device B keeps outputting the short tone signal, when it is not ready to perform the communication. However, when the device B is ready to perform the communication, the device B starts outputting continuous signals (fast signal for sending data). In this case, after confirming that received signal is the continuous signals and not the short tone signal, the device A which first outputted the long tone signals, starts outputting the continuous signals (the SD signal is inputted for a longer period of time than the short tone signal). This allows both of the devices to output the continuous signals, thereby establishing the communication.

This kind of connection procedure gives rise to two kinds of situations. One is a situation in which the device A first transmitted the long tone signals, and a situation in which the device B received the long tone signals. Through the use of the two kinds of situations, the communication between the optical interface 102 and 202 assign two kinds of parameters. It should be noted that the optical interface 202 may first output the long signals.

Secondly, idle code of the first device and that of the second device are made to be different from each other in accordance with the parameters assigned in the foregoing method. The idle code of the first device is identical to a code for causing the second device (the opposite device) to carry out the disconnection. As such, when the second device disappears, the first device receives its own idle code. This causes the first device to start a disconnection process. The idle (standby) code is status code, representing a status in which there is no data to be transmitted. Thus, the idle code is most likely to be outputted.

The optical interface 102 performs full duplex space transmission with the use of the light having a single same wavelength. As such, the light receiving section 12 receives not only the light from the second device (hereinafter referred to as the second light), but also the light (hereinafter referred to as stray light) which is emitted, toward the second device, by the light emitting section 11 of the first device and is then reflected by a transmission channel or the like. Namely, the light receiving section 12 receives the light obtained by overlapping the second light and the stray light.

In the light receiving section, the light received by the light receiving device is converted into a binary electric signal in accordance with a threshold. It is, however, difficult to fix such a threshold, because (i) a length of the communication channel (communicating distance L) is not constant, and (ii) a level of the second light varies depending on an opposite device to be communicated, due to fluctuation in performances of the light emitting devices. For those reasons, the threshold is adjusted in accordance with the level of the light received by the light receiving device. Namely, the threshold increases when continuously receiving strong light, whereas decreases when continuously receiving weak light.

If stopping the transmission (i.e., if stopping the light emission of the light emitting section 11), the threshold decreases in the light receiving section 12 of the opposite device. In order to prevent the threshold from decreasing, each of the devices in a connection state constantly transmits some kind of signals. It should be noted that, because the level of the stray light is lower than the second light, the threshold stays higher than the level of the stray light during the reception of the second light. As such, the stray light does not affect the reception of the second light. However, when the second light disappears (i.e., when the connection is released), the threshold drops, accordingly, and the stray light is eventually received.

In view of the circumstances, one of the two devices which are connected to each other is recognized as a primary, and the other device is recognized as a secondary, when establishing the connection using the tone signals. The idle code, to be transmitted when receiving data or when there is no data to transmit, varies depending on whether the first device is the primary or the secondary. The respective idle code are so assigned that they have no possibility of being transmitted during a usual data transmission.

Thus, it is possible for the optical interface 102 to judge whether the received light is the second light or the stray light, based on the code. As such, the disconnection can be detected without fail.

Thirdly, in order to eliminate the deviation of jitter, a certain number of random data is inserted into the idle code at a predetermined cycle. The idle code also serves as state information, and is the information other than data or packets. The idle code travels along buses most frequently, and is a continuous signal of a same pattern. Therefore, a transmitting circuit 301 includes a random number generating section (not shown) for generating the random code to be inserted into the idle code. A receiving circuit 303 handles the random code, put between neighboring two idle code (state information), as the idle code. It should be noted that a pitch for inserting the random code may be at random.

When the optical interface 102 is not transmitting any data, the optical interface 102 is in an idle state, and transmits the idle code. As such, the idle code is transmitted from the optical interface 102 for a long time. At this point, if both of the interfaces keep transmitting periodical waveform although clocking speed of the first device and the second device are similar to each other, then the jitter may be locally concentrated, thereby negatively affecting jitter tolerance. Here, the jitter tolerance indicates how much jitter a receiving system can tolerate.

Instead of adopting a conventional method, in which the same control code is repetitively transmitted so that the jitter tolerance deteriorates, the optical interface 102 transmits the random data code along with the control code so that correlation between the transmitted signal and the received signal is reduced. In other words, a pattern (random code) different from that of the idle code is further inserted into the idle code, when the same pattern of the idle code is repetitively transmitted.

Using the random code when continuously transmitting the idle code, it is possible for the random code to randomly change a signal level of crosstalk caused by the idle code. As such, it is possible to prevent a center of jitter distribution, which has been affected by the crosstalk, from being deviated from a center of an original jitter distribution. Therefore, it is possible to reduce the margin for signal transition and sampling points for accurately sampling signals, as compared with a conventional margin including both of the leading jitter distribution and the lagging jitter distribution of the original jitter distribution.

By minimizing the affect of the crosstalk jitter, it is possible to reduce the margin for the signal transition and the sampling points. This allows a CDR circuit 305 for sampling signals to be manufactured at low cost.

Further, in order to perform the optical space communication using the light having the same wavelength, the optical interface 102 includes the control terminal 313 and a transmission-start-signal detection circuit 307. This allows the acquirement and the detection of trigger conditions for causing the transition from a standby state to a connection confirming state. The trigger signal is inputted to the control circuit 313. This trigger signal is the control signal from the external device 3, or the detection signal derived from one of (i) the connection of the power interfaces 101 and 202, (ii) the connection of the optical interfaces 102 and 202, and (iii) the detection switch 203. It should be noted that, when using the optical fiber 210 (see FIG. 5), it is possible to confirm the connection to the second device based on the detection of the plug-in of the optical fiber 210 in the light receiving/emitting module.

As described above, the optical interfaces 102 and 202, which are optical-space-communications devices for performing full-duplex optical space communication using the light having a same wavelength, may include a transmitting circuit (i) for assigning the idle code, indicating that no data is being transmitted from the first device so that the idle code of the first device is different from the idle code of the second device, and (ii) for putting the random code having the pattern different from the pattern of the idle code between the idle code, when repetitively transmitting the idle code.

With the arrangement, the second light can be distinguished from the stray light, because the idle code of the devices are different from each other. As such, it is possible to detect the disconnection of the second device without fail. For example, when receiving code which the second device cannot transmit and which the first device can transmit, it is assumed that the connection is released by the second device. The disconnection process can be proceeded, accordingly.

Further, by insertion of the random code, it is possible to minimize the affect of the cross talk jitter, even when the idle code is repetitively transmitted. As such, the margin for the signal transition and the sampling points are reduced. As a result, it is possible to manufacture the CDR circuit for sampling signal, at low cost.

According to the optical interfaces 102 and 202, it is possible concisely realize the full-duplex space communications with the use of the light having the same wavelength.

Further, each of the optical interfaces 102 and 202 may be so arranged that (i) a receiving circuit is further provided for generating a binary reception detecting signal which is activated when receiving signals, and (ii) the transmitting circuit has a parameter, at the timing of the binary reception detecting signal, which varies depending on whether the device is the first device or the second device, and assigns the idle code in accordance with the parameter so that the idle code of the first device is different from that of the second device.

With the arrangement, it is possible to assign the idle code in accordance with the parameter which, at the timing of the binary reception detecting signal, varies depending on whether the device is the first device or the second device so that the idle code of the first device is different from that of the second device. Two kinds of tone signals are used, for example, for assigning the different parameters when connecting the devices. Those two kinds of tone signals are "confirming the second device (opposite device)" and "requesting the communication start". A parameter-a may be assigned to the device A, which is the first device to transmit the tone signal of "requesting the communication start", and a parameter-b may be assigned to the device B, which receives the tone signal from the device A.

Further, the optical interfaces 102 and 202 may include (i) trigger acquiring means for acquiring a transmission start signal from the external device, and (ii) a transmission-start-signal-detecting circuit, for carrying out the transition of the first device from the standby state to the connection confirming state, when the transmission start signal is supplied from the trigger acquiring means.

With the arrangement, it is further possible to carrying out the transition of the first device from the standby state to the connection confirming state, when the transmission start signal is supplied from the external device. Accordingly, it is possible, during the space communication, to supply trigger for confirming whether the first device is connected to the second device. It should be noted that the optical interfaces 102 and 202 in the standby state do not emit the light, nor detect the respective opposite devices. Further, during the connection confirming state, each of the optical interfaces 102 and 202 causes the first device to emit the light to find the second device, and causes the first device to change to the connection state when receiving the light from the second device.

Further, the optical interfaces 102 and 202 may include (i) trigger acquiring means for generating a transmission start signal in response to an operation by the user, and (ii) a transmission-start-signal-detecting circuit, for carrying out the transition of the first device from the standby state to the connection confirming state, when the transmission start signal is supplied from the trigger acquiring means.

With the arrangement, it is possible to carry out the transition of the first device from the standby state to the connection confirming state, when the user operates and commands, for example, to start the communication. Accordingly, it is possible, during the space communication, to supply trigger for confirming whether the first device is connected to the second device.

As described above, an electronic device in accordance with the present invention may be an electronic device, that is attachable to and detachable from an interface device, wherein: (i) the electronic device includes a first power interface, a first communication interface, a main function block, and a main power source, (ii) the interface device includes a second power interface, and a second communication interface, (iii) the first power interface is connected to the second power interface to which an external power source is connected so that power transfer can be carried out between the first and second power interfaces, while the electronic device is connected to the interface device, (iv) the first communication interface is connected to the second communication interface, to which an external device is connected, so that a communication can be carried out between the first and second communication interfaces, while the electronic device is connected to the interface device, the first communication interface being connected to the first power interface so that power supply can be carried out only between the first communication interface and the first power interface, and (v) the main function block, having a control function which functions when the electronic device is not connected to the interface device, is connected to the main power source and the first power interface so that power supply can be carried out between the main function block and the main power source, and between the main power source and the first power interface.

With the arrangement, in the electronic device, the first communication interface is connected only with the first power interface. Namely, the first communication interface is not connected with the main power source.

As such, the first communication interface operates upon receipt of the power supplied from the external power source, while the electronic device is attached to the interface device. However, while the electronic device is detached from the interface device, the first communication interface stops the operation because no power is supplied to the first communication interface. In contrast, the main function block is connected to the main power source. This allows the main function block to receive the power supply from the main power source. As such, the main function block operates, even when the electronic device is not attached to the interface device.

Accordingly, in the electronic device, the first communication interface has no power consumption, while the electronic device is detached from the interface device. This allows the reduction of the power consumption.

Further, the electronic device of the present invention may be an electronic device, that is attachable to and detachable from an interface device, wherein: (i) the electronic device includes a first power interface, a first communication interface, a main function block, and a main power source, (ii) the interface device including a second power interface, and a second communication interface, (iii) the first power interface is connected to the second power interface, to which an external power source is connected, so that power transfer can be carried out between the first and second power interfaces, while the electronic device is connected to the interface device, (iv) the first communication interface is connected to the second communication interface, to which an external device is connected, so that a communication can be carried out between the first and second communication interfaces, while the electronic device is connected to the interface device, the first communication interface being connected to the main power source and the first power interface so that power supply can be carried out between the first communication interface and the main power source, or between the first communication interface and the first power interface, via switching means for selecting, as a power supply source, one of the first communication interface and the first power interface, and (v) the main function block, having a control function which functions when the electronic device is not connected to the interface device, is connected to the main power source and the first power interface so that power supply can be carried out between the main function block and the main power source, and between the main power source and the first power interface.

With the arrangement, in the electronic device, the first communication interface is connected to the main power source and the first power interface so that power supply can be carried out between the first communication interface and the main power source, or between the first communication interface and the first power interface, via switching means for selecting, as a power supply source, one of the first communication interface and the first power interface.

With the arrangement, the first communication interface operates upon receipt of the power supplied from the external power source, while the electronic device is attached to the interface device. Further, while the electronic device is detached from the interface device, the first communication interface stops operating, when the switching means selects the first power interface. This is because the first communication interface cannot receive the power supply. On the contrary, when the switching means selects the main power source, the first communication interface operates because it receives the power supply from the main power source. Meanwhile, the main function block is connected to the main power source. This allows the main function block to receive the power supply from the main power source. As such, the main function block operates, even when the electronic device is detached from the interface device.

According to the electronic device, while the electronic device is detached from the interface device, it is possible to supply the power to the first communication interface during only the period when, for example, the communication is carried out between the electronic device and the external device via the first communication interface. Thus, it is possible to minimize the power consumption. Further, it is possible to perform the data communication with the external device or the like, even when the electronic device is not connected to the interface device.

Further, the electronic device of this invention may be adapted so that the first and second communication interfaces respectively carry out optical communication.

With the arrangement, it is further possible that the electric device and the interface device perform the data communication in the form of the optical communication.

As such, it is possible to avoid that the connector breaks down even if the plugging and the unplugging of the connector are frequently repeated. Furthermore, the high-speed data communications become possible. Additionally, the problem of the power consumption, caused by using the light as a communication interface, is solved by separating the first communication interface from the main function block.

Further, the electric device of the present invention may be adapted so the first communication interface detects a connection status between the electronic device and the interface device, in response to a recognition signal transmitted from the second communication interface.

With the arrangement, it is further possible for the first communication interface to judge the connection of the electric device with the interface device, when the first communication interface receives the recognition signal transmitted from the second communication interface.

As such, in the electronic device, it is possible to carry out the controlling such as the stopping of the operation of the first communication interface, by detecting the disconnection or connection between the electric device and the interface device.

Further, the electric device of the present invention may be adapted so that the first power interface detects a connection status between the electronic device and the interface device, in accordance with a voltage at a contact point between the first power interface and the second power interface.

With the arrangement, the first power interface can judge whether or not the electronic device is connected to the interface device, in accordance with the voltage at the contact point between the fist power interface and the second power interface, more specifically, for example, by detecting the changes in the voltages.

As such, in the electronic device, it is possible to carry out the controlling such as the stopping of the operation of the first communication interface, by detecting the disconnection or connection between the electric device and the interface device.

Further, the electric device of the present invention may be adapted so that (i) the first power interface and the second power interface are connected with each other in a non-contact manner, and (ii) the first communication interface and the second communication interface are connected with each other in a non-contact manner.

With the arrangement, the electromagnetic induction technique, or the like, is used for connecting the first power interface with the second power interface in a non-contact manner. Further, the first communication interface and the second communication interface are realized by a connection in which light receiving/emitting modules, or the like, face each other. It should be noted that the word "connection" used here, does not include "contact for holding the chassis of the electronic device and the chassis of the interface device".

As such, it is possible to connect, in a non-contact manner, the power interface of the electronic device with the power interface of the interface device, as well as the communication interface of the electronic device with the communication interface of the interface device. This enables realization of a waterproof electronic device and a waterproof interface.

Further, the electric device of the present invention may be adapted so that the first communication interface causes a light emitting device to stop emitting light, when a predetermined period of time elapses without any communication although the electronic device and the interface are connected to each other.

With the arrangement, when a predetermined period of time elapses without any communication although the electronic device and the interface are connected to each other, the following is carried out. Namely, a timer or the like is used, and after the timer shows that a predetermined period of time elapses, the first communication interface causes the light emitting device to stop emitting the light from. As such, it is possible for the electronic device to reduce the power consumption of the first communication interface.

Further, the electric device of the present invention may be adapted so that while (i) the electronic device is connected to the interface device, and (ii) a light emitting device stops light emission, the first communication interface causes the light emitting device to start emitting light in response to a trigger signal received from the external device via the second communication interface.

With the arrangement, while the electronic device is connected to the interface device, and while the light emitting device stops emitting the light, it is possible, by inputting the trigger signal from the external device, for the first communication interface to cause the light emitting device to start emitting the light. As such, it is possible for the external device to control the resumption of the data communication between the electronic device and the interface device.

Further, an interface device of the present invention may be an interface device, that is attachable to and detachable from an electronic device, including a second power interface, and a second communication interface, in which the second communication interface has a function for controlling the communication between the first and second communication interfaces.

With the arrangement, it is possible to realize a interface device (so-called cradle), that can simply carry out the charging of the electronic device and can simply carry out the data communication with an external device.

Further, the interface device of the present invention may be an interface device, that is attachable to and detachable from an electronic device, including a second power interface, in which the second communication interface serves as a connection terminal for an optic fiber, and the optic fiber is connected to the external device having a function for controlling the communication between the first and second communication interfaces.

With the arrangement, it is possible to realize an interface device (i.e., a cradle) which can easily carry out the charging of the electronic device, and can easily carry out the data communication between the electronic device and the external device. Further, it is possible to realize the interface device having a simple configuration. This is because the external device can have the function for controlling the communication with the first communication interface. In other words, this is because the interface device merely requires that only optical fiber connection terminal be provided, i.e., the interface device requires no function for controlling the communication. This allows the interface device to have a simple configuration.

Further, the interface device of the present invention may further include detecting means for detecting a connection of the interface device with the electronic device.

With the arrangement, it is further possible to judge whether or not the electronic device and the interface device are connected to each other, in accordance with a result detected by the detecting means. It should be noted that the detecting means can be realized by a switch of various types, such as a mechanical type or an optical type.

It is thus possible for the interface device to carry out the controlling such as the stopping of the operation of the second communication interface and/or the second power interface, based on the detection of the connection, or the disconnection between the electronic device and the interface device.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An electronic device, that is attachable to and detachable from an interface device, wherein:
   the electronic device includes a first power interface, a first communication interface, a main function block, and a main power source,
   the interface device includes a second power interface, and a second communication interface,
   the first power interface is connected to the second power interface to which an external power source is connected so that power transfer can be carried out between the first and second power interfaces, while the electronic device is connected to the interface device,
   the first communication interface is connected to the second communication interface, to which an external device is connected, so that a communication can be carried out between the first and second communication interfaces, while the electronic device is connected to the interface device, the first communication interface being connected to the first power interface so that power supply can be carried out only between the first communication interface and the first power interface, and
   the main function block, having a control function which functions when the electronic device is not connected to the interface device, is connected to the main power source and the first power interface so that power supply can be carried out between the main function block and the main power source, and between the main power source and the first power interface.

2. The electronic device as set forth in claim 1, wherein the first power interface detects a connection status between the electronic device and the interface device in accordance with a voltage at a contact point between the first and second power interfaces.

3. The electronic device as set forth in claim 1, wherein the first and second communication interfaces respectively carry out optical communication.

4. The electronic device as set forth in claim 3, wherein the first communication interface detects a connection status between the electronic device and the interface device, in response to a recognition signal transmitted from the second communication interface.

5. The electronic device as set forth in claim 3, wherein the first power interface detects a connection status between the electronic device and the interface device, in accordance with a voltage at a contact point between the fist power interface and the second power interface.

6. The electronic device as set forth in claim 3, wherein the first power interface and the second power interface are connected with each other in a non-contact manner, and the first communication interface and the second communication interface are connected with each other in a non-contact manner.

7. The electronic device as set forth in claim 3, wherein the first communication interface causes a light emitting device to stop emitting light, when a predetermined period of time elapses without any communication although the electronic device and the interface are connected to each other.

8. The electronic device as set forth in claim 3, wherein, while (i) the electronic device is connected to the interface device, and (ii) a light emitting device stops light emission, the first communication interface causes the light emitting device to start emitting light in response to a trigger signal received from the external device via the second communication interface.

9. The electronic device as set forth in claim 1, wherein the first and second communication interfaces respectively carry out optical communication.

10. The electronic device as set forth in claim 9, wherein the first communication interface detects a connection status between the electronic device and the interface device, in response to a recognition signal transmitted from the second communication interface.

11. The electronic device as set forth in claim 9, wherein the first power interface detects a connection status between the electronic device and the interface device, in accordance with a voltage at a contact point between the first power interface and the second power interface.

12. The electronic device as set forth in claim 9, wherein:
   the first power interface and the second power interface are connected with each other in a non-contact manner, and
   the first communication interface and the second communication interface are connected with each other in a non-contact manner.

13. The electronic device as set forth in claim 9, wherein the first communication interface causes a light emitting device to stop emitting light, when a predetermined period of time elapses without any communication although the electronic device and the interface are connected to each other.

14. The electronic device as set forth in claim 9, wherein, while (i) the electronic device is connected to the interface device, and (ii) a light emitting device stops light emission, the first communication interface causes the light emitting device to start emitting light in response to a trigger signal received from the external device via the second communication interface.

15. An electronic device, that is attachable to and detachable from an interface device, wherein:

the electronic device includes a first power interface, a first communication interface, a main function block, and a main power source, the interface device including a second power interface, and a second communication interface, the first power interface is connected to the second power interface, to which an external power source is connected, so that power transfer can be carried out between the first and second power interfaces, while the electronic device is connected to the interface device, the first communication interface is connected to the second communication interface, to which an external device is connected, so that a communication can be carried out between the first and second communication interfaces, while the electronic device is connected to the interface device, the first communication interface being connected to the main power source and the first power interface so that power supply can be carried out between the first communication interface and the main power source, or between the first communication interface and the first power interface, via switching means for selecting, as a power supply source, one of the first communication interface and the first power interface, and the main function block, having a control function which functions when the electronic device is not connected to the interface device, is connected to the main power source and the first power interface so that power supply can be carried out between the main function block and the main power source, and between the main power source and the first power interface.

16. The electronic device as set forth in claim 15, wherein the first power interface detects a connection status between the electronic device and the interface device, in accordance with voltage at a contact point between the first and second power interfaces.

17. An interface device, that is attachable to and detachable from an electronic device, wherein:

the electronic device includes a first power interface, a first communication interface, a main function block, and a main power source, the interface device includes a second power interface, and a second communication interface, the first power interface is connected to the second power interface to which an external power source is connected so that power transfer can be carried out between the first and second power interfaces, while the electronic device is connected to the interface device, the first communication interface is connected to the second communication interface, to which an external device is connected, so that a communication can be carried out between the first and second communication interfaces, while the electronic device is connected to the interface device, the first communication interface being connected to the first power interface so that power supply can be carried out only between the first communication interface and the first power interface, the main function block, having a control function which functions when the electronic device is not connected to the interface device, is connected to the main power source and the first power interface so that power supply can be carried out between the main function block and the main power source, and between the main power source and the first power interface, and the second communication interface has a function for controlling the communication between the first and second communication interfaces.

18. The interface device as set forth in claim 17, further comprising detecting means for detecting a connection of the interface device with the electronic device.

19. An interface device, that is attachable to and detachable from an electronic device, wherein:

the electronic device includes a first power interface, a first communication interface, a main function block, and a main power source, the interface device includes a second power interface, and a second communication interface, the first power interface is connected to the second power interface to which an external power source is connected so that power transfer can be carried out between the first and second power interfaces, while the electronic device is connected to the interface device, the first communication interface is connected to the second communication interface, to which an external device is connected, so that a communication can be carried out between the first and second communication interfaces, while the electronic device is connected to the interface device, the first communication interface being connected to the main power source and the first power interface so that power supply can be carried out between the first communication interface and the main power source, or between the first communication interface and the first power interface, via switching means for selecting, as a power supply source, one of the first communication interface and the first power interface, the main function block, having a control function which functions when the electronic device is not connected to the interface device, is connected to the main power source and the first power interface so that power supply can be carried out between the main function block and the main power source, and between the main power source and the first power interface, and the second communication interface has a function for controlling the communication between the first and second communication interfaces.

20. The interface device as set forth in claim 19, further comprising detecting means for detecting a connection of the interface device with the electronic device.

21. An interface device, that is attachable to and detachable from an electronic device, wherein:

the electronic device includes a first power interface, a first communication interface, a main function block, and a main power source, the interface device includes a second power interface, and a second communication interface, the first power interface is connected to the second power interface to which an external power source is connected so that power transfer can be carried out between the first and second power interfaces, while the electronic device is connected to the interface device, the first communication interface is connected to the second communication interface, to which an external device is connected, so that a communication can be carried out between the first and second communication interfaces, while the electronic device is connected to the interface device, the first communication interface being connected to the first power interface so that power supply can be carried out only between the first communication interface and the first power interface, the main function block, having a control function which functions when the electronic device is not connected to the interface device, is connected to the main power source and the first power interface so that power supply can be carried out between the main function block and the main power source, and between the main power source and the first power interface, the first and second communication interfaces respectively carry out optical communication, the second communication interface serves as a connection terminal for an optic fiber, and the optic fiber is connected to the external device having a function for controlling the communication between the first and second communication interfaces.

22. The interface device as set forth in claim 21, further comprising detecting means for detecting a connection of the interface device with the electronic device.

23. An interface device, that is attachable to and detachable from an electronic device, wherein:

the electronic device includes a first power interface, a first communication interface, a main function block, and a main power source, the interface device includes a second power interface, and a second communication interface, the first power interface is connected to the second power interface to which an external power source is connected so that power transfer can be carried out between the first and second power interfaces, while the electronic device is connected to the interface device, the first communication interface is connected to the second communication interface, to which an external device is connected, so that a communication can be carried out between the first and second communication interfaces, while the electronic device is connected to the interface device, the first communication interface being connected to the main power source and the first power interface so that power supply can be carried out between the first communication interface and the main power source, or between the first communication interface and the first power interface, via switching means for selecting, as a power supply source, one of the first communication interface and the first power interface, the main function block, having a control function which functions when the electronic device is not connected to the interface device, is connected to the main power source and the first power interface so that power supply can be carried out between the main function block and the main power source, and between the main power source and the first power interface, the first and second communication interfaces respectively carry out optical communication, the second communication interface serves as a connection terminal for an optic fiber, and the optic fiber is connected to the external device having a function for controlling the communication between the first and second communication interfaces.

24. The interface device as set forth in claim 23, further comprising detecting means for detecting a connection of the interface device with the electronic device.

* * * * *